(12) United States Patent
Fischer et al.

(10) Patent No.: US 10,508,579 B2
(45) Date of Patent: Dec. 17, 2019

(54) MIXER DEVICE

(71) Applicant: Friedrich Boysen GmbH & Co. KG, Altensteig (DE)

(72) Inventors: Michael Fischer, Nagold (DE); Andres Haas, Dornstetten (DE); Stefan Sauer, Wildberg (DE); Dennis Sailer, Altensteig (DE); Bernd Burkhardt, Baiersbronn (DE)

(73) Assignee: FRIEDRICH BOYSEN GMBH & CO. KG, Altensteig (DE)

( * ) Notice: Subject to any disclaimer, the term of this patent is extended or adjusted under 35 U.S.C. 154(b) by 85 days.

(21) Appl. No.: 15/692,640

(22) Filed: Aug. 31, 2017

(65) Prior Publication Data

US 2019/0063293 A1 Feb. 28, 2019

(51) Int. Cl.
| | | |
|---|---|---|
| *F01N 3/20* | (2006.01) | |
| *F01N 3/28* | (2006.01) | |
| *F01N 13/08* | (2010.01) | |
| *B01F 5/00* | (2006.01) | |
| *B01F 5/04* | (2006.01) | |
| *B01F 3/04* | (2006.01) | |

(52) U.S. Cl.
CPC ........ *F01N 3/2892* (2013.01); *B01F 3/04049* (2013.01); *B01F 5/0057* (2013.01); *B01F 5/0451* (2013.01); *F01N 3/2066* (2013.01); *F01N 13/08* (2013.01); *B01F 2005/0091* (2013.01); *F01N 2240/20* (2013.01); *F01N 2610/1453* (2013.01)

(58) Field of Classification Search
CPC .. F01N 3/2066; F01N 3/2892; F01N 2240/20; F01N 2610/02; F01N 2610/1453

USPC .......................................................... 60/324
See application file for complete search history.

(56) References Cited

U.S. PATENT DOCUMENTS

| | | | |
|---|---|---|---|
| 8,347,610 B2 | 1/2013 | Kowada | |
| 2009/0313979 A1 | 12/2009 | Kowada | |
| 2015/0218996 A1* | 8/2015 | Brandl | .................. B01F 5/0268 |
| | | | 60/295 |
| 2016/0061078 A1* | 3/2016 | Schmidt | ................ F01N 3/2066 |
| | | | 60/295 |
| 2016/0265409 A1* | 9/2016 | Puschel | .................. B01D 53/94 |

(Continued)

FOREIGN PATENT DOCUMENTS

| | | |
|---|---|---|
| DE | 10 2012 021 017 A1 | 4/2014 |
| EP | 2 128 398 B1 | 12/2013 |
| WO | 2014/063772 B2 | 5/2014 |

*Primary Examiner* — Audrey K Bradley
(74) *Attorney, Agent, or Firm* — Amster, Rothstein & Ebenstein LLP

(57) ABSTRACT

A mixer device for introducing and distributing a liquid into a gas flow comprises a mixing chamber which can be flowed through by the gas flow, an overflow pipe which is arranged at least partly in the mixing chamber and which has a jacket surface and a first and a second pipe end, and at least one injector associated with the first pipe end of the overflow pipe to inject the liquid into the overflow pipe. The jacket surface of the overflow pipe has at least one inflow opening through which gas can flow from the mixing chamber into the overflow pipe for a subsequent mixing with the injected fluid. The overflow pipe is configured such that inflowing gas in its interior can have two swirl components of opposite senses imparted onto it.

35 Claims, 31 Drawing Sheets

(56) References Cited

U.S. PATENT DOCUMENTS

2017/0211449 A1* 7/2017 Gockel ................ F01N 3/2066
2018/0023443 A1* 1/2018 Inclan ................... F01N 3/2066
                                                    60/282

* cited by examiner

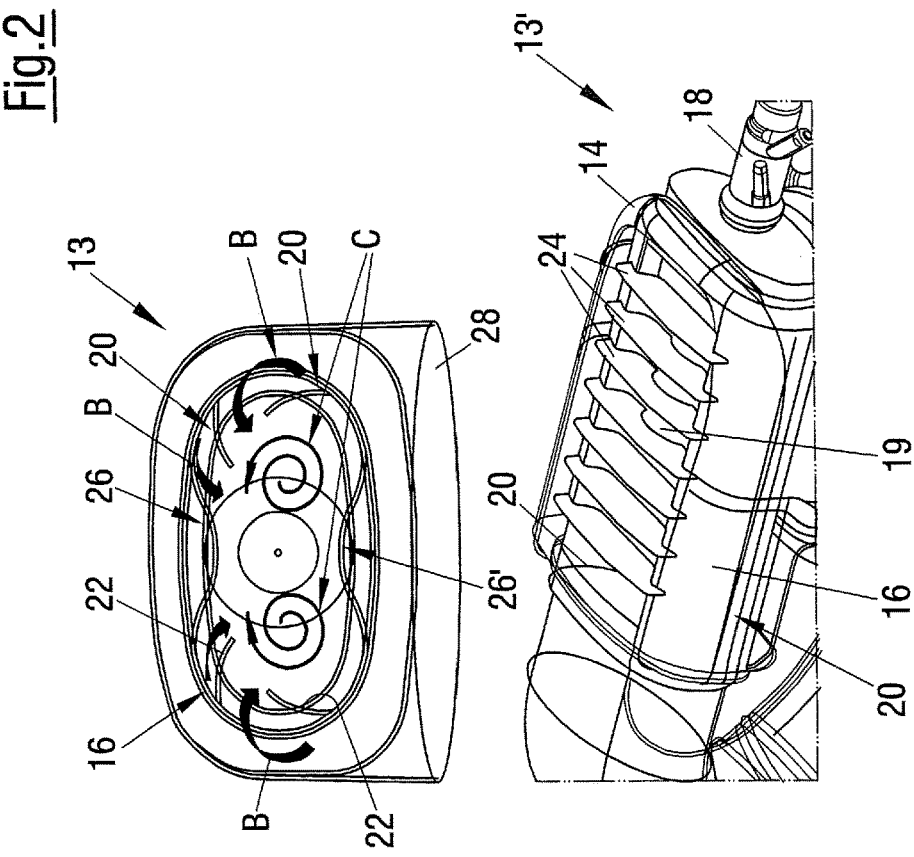
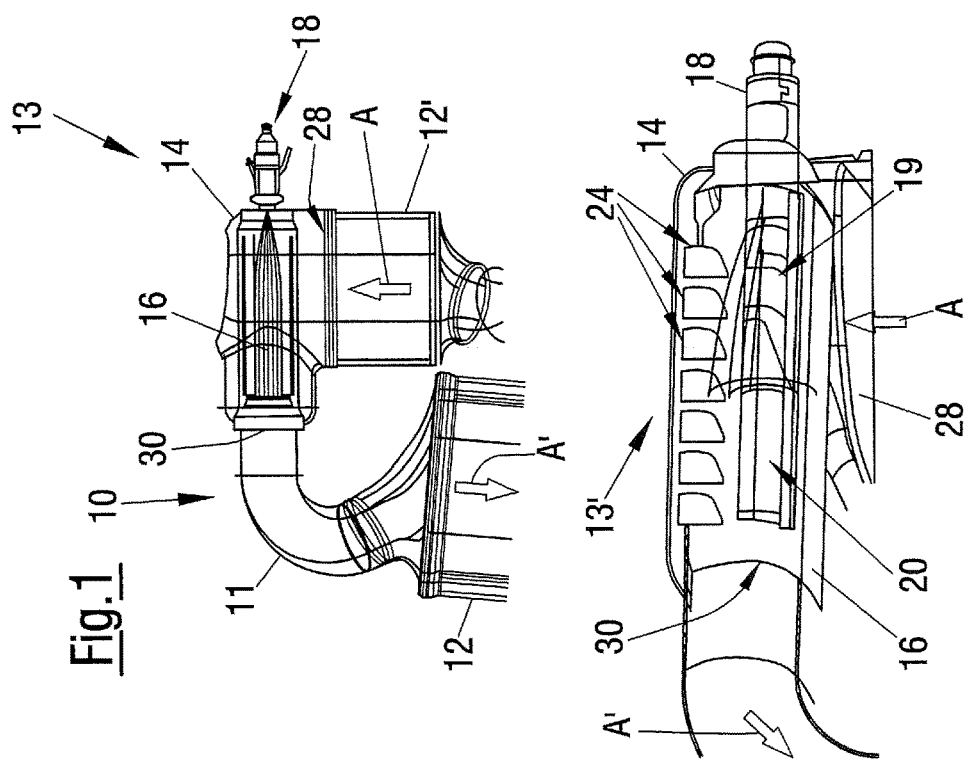

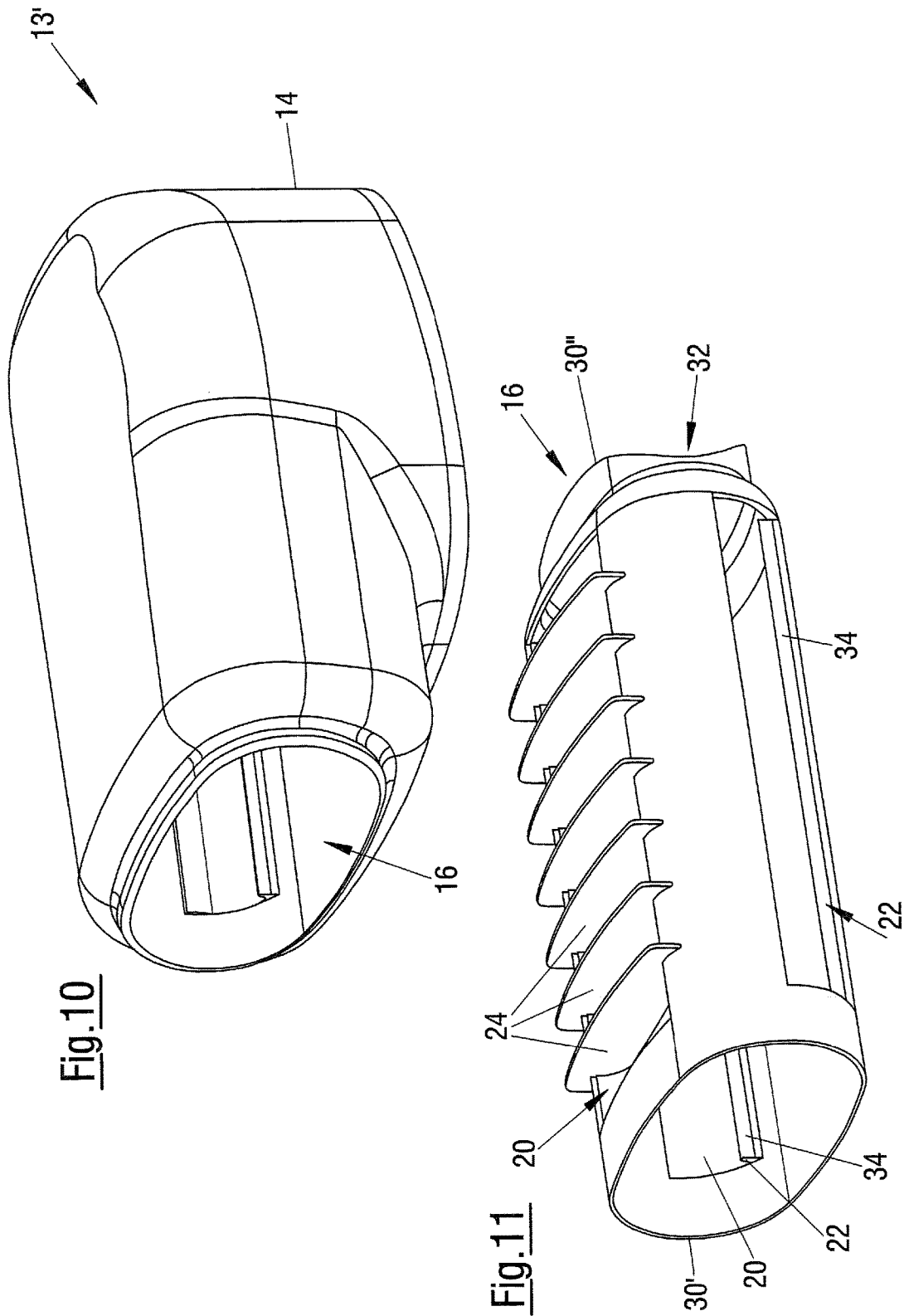

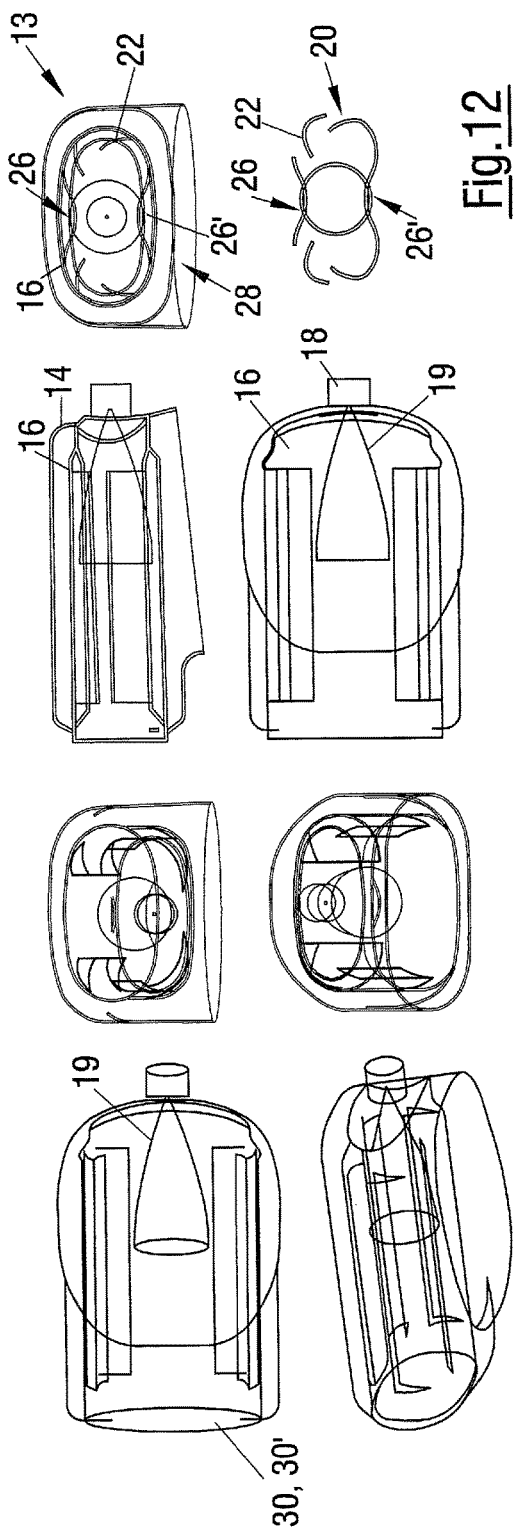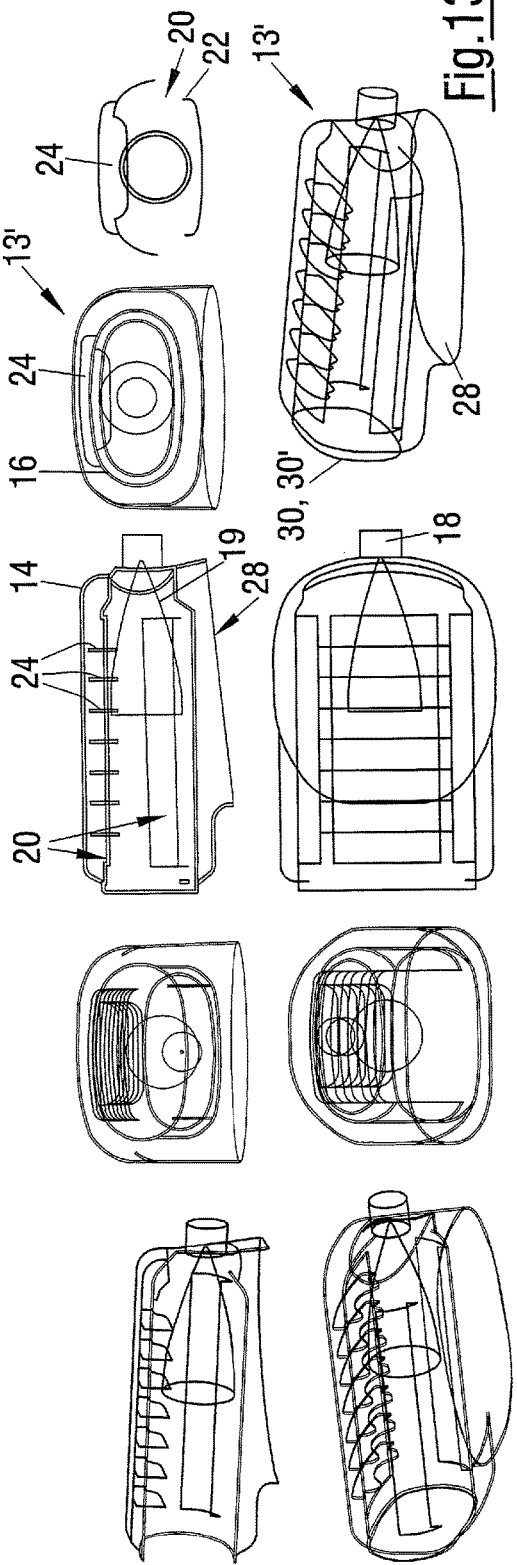

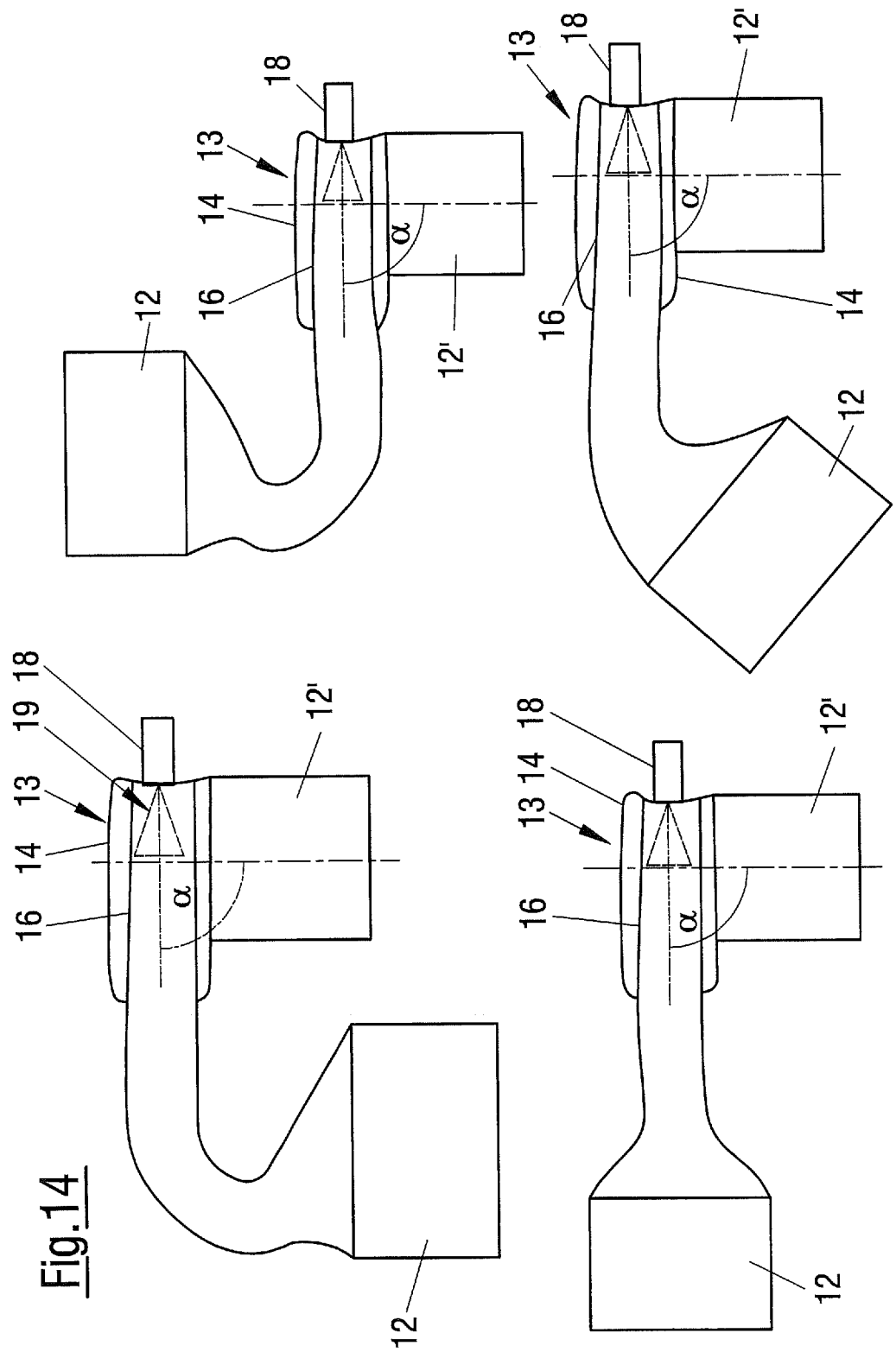

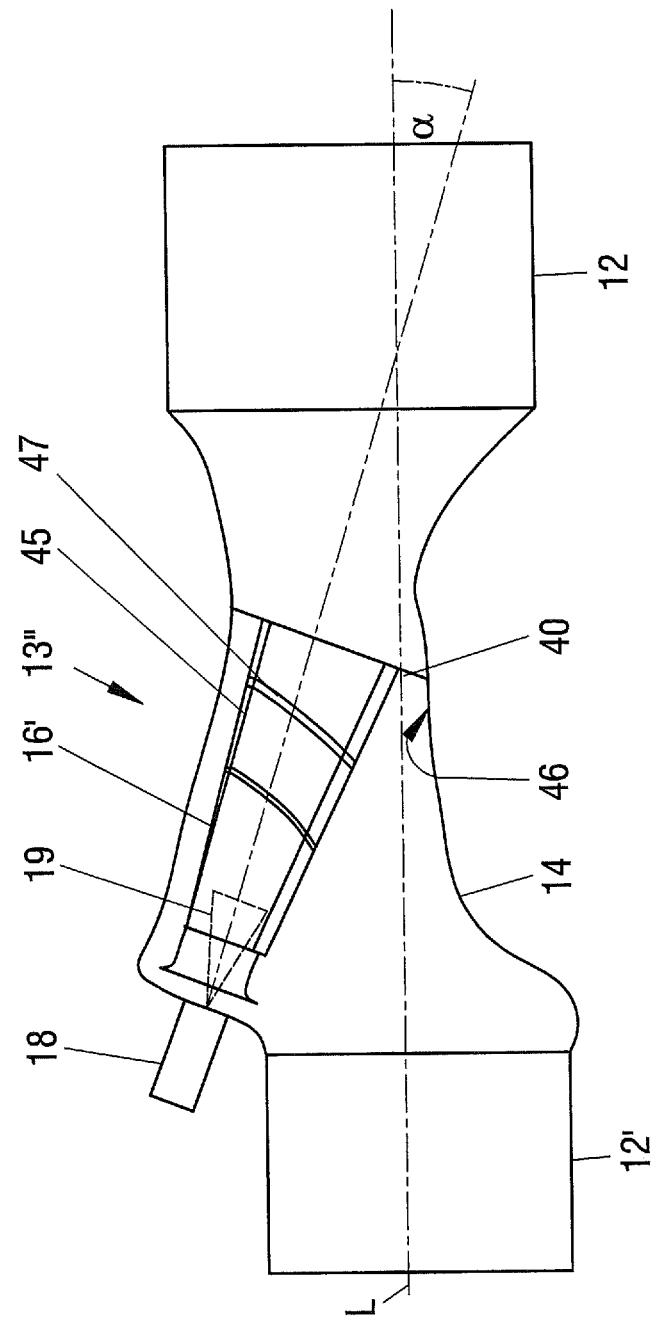

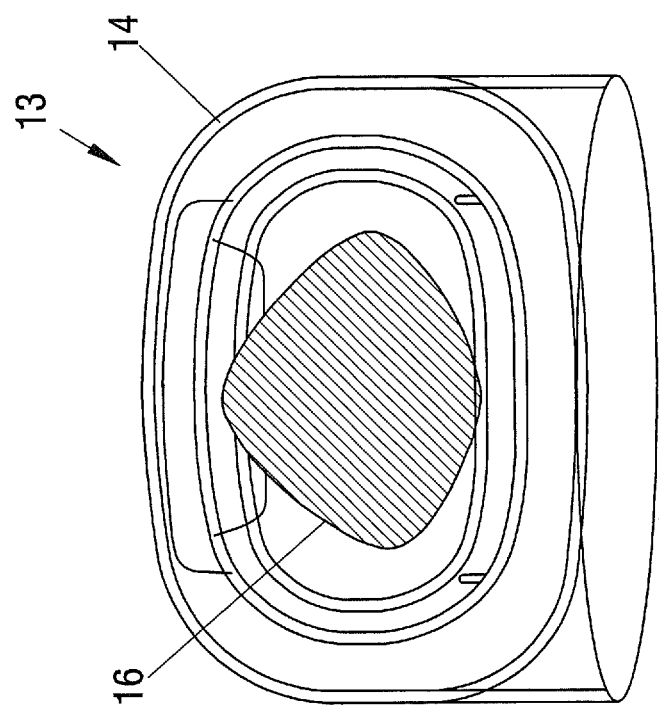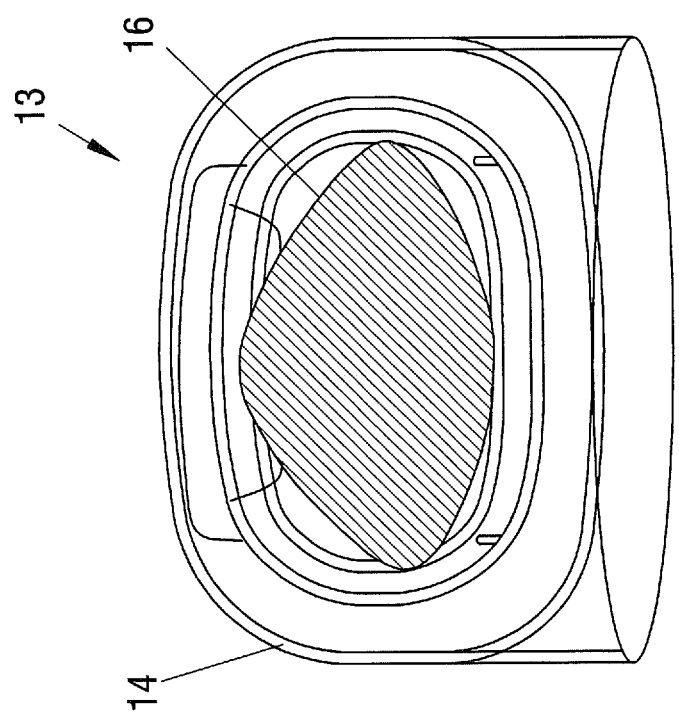
Fig. 27

MIXER DEVICE

The present invention relates to a mixer device for introducing and distributing a liquid in a gas flow, in particular for introducing and distributing a liquid reductant into an exhaust gas flow.

Such mixer devices are generally used to intermix a gas flow, to distribute an injected liquid into the gas flow and/or to promote a vaporization of the liquid.

The problem of vaporizing and distributing a liquid reliably in a suitable form in a gas flow in order, for example, to enable a chemical reaction of components of the gas flow with components of the vaporized liquid is one which arises in a number of application areas. This problem arises in exhaust gas engineering, for example, in connection with the SCR process in which an aqueous urea solution is introduced into the exhaust train of a motor vehicle, e.g. by means of a metering pump or an injector. Ammonia and $CO_2$ are produced from the urea solution by thermolysis and hydrolysis. The ammonia produced in this manner can react in a suitable catalytic converter with the nitrogen oxides contained in the exhaust gas which are thus efficiently removed from the gas flow.

It is of particular relevance in this process that the urea solution is supplied in a suitable ratio to the nitrogen oxide quantity contained in the exhaust gas. It is moreover of great importance that the urea solution introduced into the exhaust gas flow is vaporized as completely as possible and is uniformly distributed in the exhaust gas flow.

To ensure an efficient distribution and vaporization of the liquid introduced into the gas flow, a mixer device is frequently provided after, at and/or in front of the introduction point of the liquid in the flow direction. The term "mixer device" is to be understood as broad in this context. Such a device can comprise components that influence the flow of the gas flow and/or that effect a vaporization of the liquid droplets sprayed in (e.g. their vaporization on a surface hot in operation).

Although conventional mixer devices effect an acceptable degree of homogenization of the gas flow in many cases, there is still a need for efficient mixer devices to achieve a distribution of the liquid in the gas flow which is as complete as possible and is in particular faster without excessively hindering the exhaust gas flow. In other words, the mixer device should generate as little counter-pressure as possible in the exhaust gas flow.

Efficient mixer devices are in particular in demand in exhaust gas engineering. The greater the efficiency of the mixer device namely is, the better the quantity of urea injected into the exhaust gas flow can be adapted to the quantity of nitrogen oxides contained in the exhaust gas. This ultimately results in an improved exhaust gas treatment. A homogeneous distribution of the reductant is particularly important with exhaust gas treatment concepts close to the engine. Mixer devices, however, also play an important role in many sectors of chemical process engineering.

It is therefore an object of the invention to provide an efficient mixer device for distributing and vaporizing a liquid introduced into a gas flow which is accompanied by an increase in the counter-pressure that is as small as possible. The mixer device should additionally be able to be manufactured simply and inexpensively.

A mixer device in accordance with the invention comprises a mixing chamber which can be flowed through by the gas flow, an overflow pipe arranged at least partly—preferably completely—in the mixing chamber, which has a jacket surface and a first and a second pipe end, and at least one injector associated with the first pipe end of the overflow pipe to inject the liquid into the overflow pipe. The jacket surface of the overflow pipe screens the injection region at least partly and thus minimizes unwanted dispersals of the spray cone. Since the overflow pipe is at least sectionally flowed around by exhaust gas from the outside, its surface is comparatively hot. Liquid drops impacting the hot surface are vaporized.

The injector is in particular arranged in the region of the upstream pipe end of the overflow pipe so that substantially the entire jacket surface is used for protection against dispersals and for promoting vaporization. A main injection direction defined by the injector can furthermore extend at least substantially in parallel with or lightly obliquely to the center axis of the overflow pipe. Provision can in particular be made that the main injection direction coincides with the center axis of the overflow pipe. This means that the injector can be designed for an axial injection into the overflow pipe. The cone axis of an injection cone can, for example, be understood as the main injection direction. It is preferred for the total liquid to be injectable into the overflow pipe.

The term "pipe" is to be understood broadly in connection with the overflow pipe and should designate any open hollow body that does not necessarily have a round cross-section.

The mixing chamber can completely surround the overflow pipe. The overflow pipe can alternatively also be partly led out of the mixing chamber or can project out of it.

The invention provides that the jacket surface of the overflow pipe has at least one inflow opening through which gas can flow from the mixing chamber into the overflow pipe for a subsequent mixing with the injected fluid and that the overflow pipe is configured such that two swirl components of opposite senses can be imparted onto the inflowing gas in the interior of said overflow pipe. It has been found that a double swirl formed by two swirl components of opposite senses in the overflow pipe enables a particularly uniform distribution of the liquid. The overflow pipe can also be configured such that three or more swirl components can be imparted onto the inflowing gas in its interior. This means that, for example, the generation of a fourfold swirl can be provided instead of a double swirl, with respective adjacent swirl components preferably being of opposite senses.

Provision can be made that an injection region defined by the injector is located at least substantially completely within the overflow pipe. This makes particularly good protection from spray dispersals possible.

It is preferred for a gas inlet of the mixer device to be associated with the mixing chamber. The gas can flow into the mixing chamber through the gas inlet and can optionally flow onto the overflow pipe.

In accordance with an embodiment of the invention, a gas inlet of the mixer device defines an inflow direction extending at a right angle or obliquely to the center axis of the overflow pipe.

The jacket surface of the overflow pipe can in particular have a section onto which a gas flow flowing in through the gas inlet can directly flow.

The jacket surface of the overflow pipe can have at least two inflow openings to generate and/or amplify the swirl components of opposite senses and the gas flow flowing in through the gas inlet can in particular not flow directly—that is in particular not perpendicular—onto said two inflow openings which are arranged at both sides of the section of the jacket surface that can be directly flowed onto. It is therefore preferred for the at least two inflow openings to be able not to be flowed onto frontally or at least not over the whole surface from the gas inlet and thus to effect an at least part deflection of the gas flowing through them with a corresponding swirl generation. It is preferred in this respect for the region of the jacket surface of the overflow pipe that can be flowed onto frontally from the gas inlet is designed without openings (free of interruption). A branching of the flow into two part flows and a leading of these part flows to the lateral inflow openings thereby result. In addition, the injection region of the injector is effectively screened toward the inlet opening of the mixing chamber in this manner.

The inflow openings can be laterally offset with respect to a main flow direction defined by the gas inlet of the mixer device and/or can be arranged oppositely disposed with respect to a center plane of the overflow pipe. This effects a particularly efficient generation of a double swirl.

The second pipe end of the overflow pipe can be a gas outlet of the mixer device. The gas outlet is in this respect preferably provided as the only outlet of the mixing chamber. This means that it is preferred for substantially all the gas flowing through the mixing chamber also to flow through the overflow pipe. In principle, however, a bypass could also be provided through which a (small) portion of the gas flow can flow directly out of the mixing chamber without passing through the overflow pipe.

A further embodiment of the invention provides that the overflow pipe has two differently swirl-generating inner wall sections to generate and/or amplify the swirl components of opposite senses. The inner wall sections can be molded directly into the overflow pipe or can be fastened to the inner wall of the overflow pipe as separate elements. The inner wall sections can be curved for a particularly effective swirl generation. The overflow pipe can also have more than two differently swirl-generating inner wall sections.

In accordance with an embodiment, the two differently swirl-generating inner wall sections are formed by lateral regions of a concavity projecting into the overflow pipe. This enables a particularly compact construction.

The overflow pipe can at least sectionally have a kidney-shaped cross-section and/or a cross-section in the form of an eight lying on its side to generate and/or amplify the swirl components of opposite directions. The opposed swirl components can be formed in the two adjacent dimples or indentations of such an overflow pipe.

At least one guide vane, preferably at least one curved guide vane, can be arranged at the at least one inflow opening of the overflow pipe and imparts a tangential flow component onto the gas flowing into the overflow pipe. The swirl generation can be adapted in a desired manner by a corresponding dimensioning and shaping of the guide vane.

Provision can be made that the at least one guide vane is formed in one piece with the overflow pipe and is preferably formed by a surface piece folded out of the jacket surface of the overflow pipe. This saves manufacturing costs and assembly costs.

An embodiment of the invention provides that the orientation and/or the curvature of the at least one guide vane varies viewed in the axial direction of the overflow pipe. The desired swirl formation can thereby be further improved.

In accordance with a further embodiment of the invention, the jacket surface of the overflow pipe has at least two inflow openings having respective guide vanes, with the guide vanes imparting tangential flow components differing direction-wise onto the gas flowing into the overflow pipe to generate and/or amplify the swirl components of opposite senses. A particularly pronounced double swirl is thereby generated that effects a high uniform distribution of the injected liquid.

The interior of the overflow pipe can be divided at least sectionally into at least two separate flow regions, in which two swirl components of opposite senses can be respectively imparted onto the inflowing gas, to generate and/or amplify at least four different swirl components. The degree of turbulence can hereby be further increased. The division can in particular be symmetrical. The imparting of swirl components of opposite senses in one of the flow regions can, viewed per se in this respect, take place in dependence on the application by shaping the inner wall and/or by means of guide vanes as was described above in connection with other embodiments.

The flow regions are preferably separated from one another by at least one wall element arranged in the overflow pipe and extending along an axial section thereof. This enables a particularly simple division of the interior of the overflow pipe into separate flow regions. Since the separation is only sectionally provided by the wall element, the corresponding part flows can mix with one another again after the swirl generation.

The wall element can be formed as a planar plate, preferably of sheet metal. Alternatively, the wall element can be at least sectionally curved and/or have bulges for a flow optimization. The wall element also does not only have to be a simple metal sheet, but can as required also have a more complex design and/or a more complex shape.

The overflow pipe can at least sectionally have an oval or rounded-edge cross-section.

Provision can be made that the cross-sectional shape and/or the cross-sectional surface of the overflow pipe and/or of the mixing chamber varies viewed in the axial direction of the overflow pipe. A shape change from round to oval or vice versa, from an eight lying on its side to oval or vice versa or from an eight lying on its side to round or vice versa can take place, for example. Alternatively or additionally, the overflow pipe can widen or taper viewed in the injection direction. Special embodiments provide a conical widening or tapering. A trumpet-shaped widening or tapering can also be provided. The extent of the shape and size of the overflow pipe can be individually adapted to the construction space requirements, to the properties of the liquid jet, and to the flow relationships.

Provision can also be made that the at least one inflow opening of the overflow pipe is increased or decreased in size in the axial direction. This enables a further adaptation or the swirl and eddy formation.

At least one flow guidance element can be arranged at the inner side of the jacket surface and extends in the axial direction and in the peripheral direction of the overflow pipe. The at least one flow guidance element can in particular be helical at least sectionally. Such a flow guidance element generates a swirl having an axial component that further improves the liquid distribution. The flow guidance element can in particular at least sectionally extend obliquely to the longitudinal extent of the overflow pipe.

A further embodiment of the invention provides that an arrangement of a plurality of guide elements is arranged in the region of an inflow opening of the overflow pipe that extend transversely to the center axis of the overflow pipe and that preferably extend at least substantially in parallel with one another. They preferably extend substantially perpendicular to the main injection direction of the injector, but can also be positioned at an angle with respect to the main injection direction as desired to support the vaporization of the injected liquid and to influence the flow in the overflow pipe in the desired manner. At least five such guide elements are preferably provided. The guide elements can be designed in a plate-like manner and/or can form a slat-like structure similar to venetian blinds. It has been found that such a structure—particularly in conjunction with a double swirl generated in the overflow pipe—further improves the distribution of the liquid. An amplification of the previously generated double swirl is in particular possible. Depending on the application, the guide elements can have a planar shape or a curved shape.

The guide elements are preferably arranged in the region of an inflow opening that is remote from a gas inlet of the mixer device. The guide elements are not flowed onto directly in this embodiment. This has proved particularly favorable with respect to the mixing power. The guide elements can be arranged at regular intervals or at irregular intervals with respect to one another and can be of the same size or of different sizes depending on the application. The shape can likewise be the same or different. The arrangement, shape, and size of the guide elements can be selected such that a film formation on the guide elements is counteracted as effectively as possible.

The guide elements—not necessarily all of them—can have at least one cut-out whose shape and size can be selected in dependence on a desired surface impact density. The cut-out is a hole, for example.

The border of at least one of the cut-outs can have a sleeve-like section extending in the axial direction. The part flow of the injection region can thereby the oriented better and the injection cone is protected.

The guide elements can be formed by folded-out wall sections of a pipe element. The non-folded out wall sections of the pipe element form sleeve-like sections in this embodiment that can be manufactured particularly easily.

A further embodiment of the invention provides that the guide elements project through the inflow opening into the overflow pipe, preferably up to different distances. The uniform distribution of the liquid can hereby be improved.

Provision can be made that a wall element that is arranged to provide separate flow regions in the overflow pipe passes through the arrangement of guide elements.

The first pipe end of the overflow pipe can be connected to an inner wall of the mixing chamber in a substantially gas-tight manner in order thus also to encase and thereby to protect the injection region in its section close to the injector.

Alternatively, the first pipe end of the overflow pipe can at least sectionally be spaced apart from an inner wall of the mixing chamber. This enables a flowing behind or a flushing behind the nozzle of the injector and counteracts the unwanted formation of deposits. An at least partly formed ring gap that enables a gas entry at the first pipe end and thus provides a bypass of the inflow openings results, for example, due to the (sectional) spacing apart of the first pipe end from the inner all of the mixing chamber. Instead of a gap, separate openings can also be provided in the region of the first pipe end.

A special embodiment of the invention provides that the first pipe end of the overflow pipe is at least sectionally surrounded by a sleeve that is provided with at least one opening. Such a sleeve acts as a restrictor element and supports a homogenization of the gas pressure in the region of the ring gap and/or of the bypass opening(s) to optimize the flushing behind of the nozzle of the injector.

The first pipe end of the overflow pipe can have a widened portion that in particular has a conical, trumpet-like or tulip-like shape. Such a widened portion acts as a diffuser. Provision can be made that the widened portion adjoins a constriction.

In the region of the first pipe end of the overflow pipe, a metal separation sheet extending in the radial direction can be provided to separate an onflow region of the sleeve from an onflow region of the remaining overflow pipe.

In accordance with a special embodiment of the invention, the mixing chamber and/or the overflow pipe opens/open into an intermediate pipe in which at least one discontinuity element is arranged that sectionally prevents or blocks the flow. The discontinuity element can in particular be a plate-like element that extends transversely or obliquely to the flow direction. The at least one discontinuity element is preferably arranged in a zone of the intermediate pipe in which a comparatively small flow speed is present. The discontinuity element forces the gas that flows comparatively calmly there back into the flow eddy/swirl flow, whereby the homogenization of the gas flow is improved.

The invention also relates to an exhaust gas system having a first exhaust gas treatment device, in particular having an oxidation catalyst, and having a second exhaust gas treatment device, in particular a reduction catalyst, arranged downstream of the first exhaust gas treatment device.

In accordance with the invention, a mixer device as described above is arranged between the two exhaust gas treatment devices in the flow direction of the exhaust gas.

The mixer device can be arranged and configured such that the overflow pipe is arranged substantially perpendicular to a longitudinal axis of the first exhaust gas treatment device. The overflow pipe can therefore be arranged transversely to the oxidation catalyst, for example. This embodiment enables a direct onflow of the overflow pipe without substantial deflection of the exhaust gas flow exiting the first exhaust gas device.

Alternatively, the mixer device can be arranged and configured such that the overflow pipe is arranged obliquely to a longitudinal axis of the first exhaust gas treatment device, in particular with the overflow pipe having a trumpet-like shape. Such an oblique longitudinal arrangement can be favorable with specific spatial space specifications.

A terminal element can be provided that comprises a wall that extends between the jacket surface of the overflow pipe and an inner wall of the mixing chamber and which forces the gas moving from the first exhaust gas treatment device into the mixer device to flow substantially completely through the overflow pipe.

Further developments of the invention are also set forth in the dependent claims, in the description and in the enclosed drawings.

The invention will be described in the following by way of example with reference to the drawings.

FIG. 1 shows a mixer device in accordance with an embodiment of the invention in a side view;

FIG. 2 is a sectional view of the mixer device in accordance with FIG. 1;

FIG. 3 is a cut-open perspective representation of a further embodiment of the invention;

FIG. 4 is a partly transparent perspective representation of a further embodiment of the invention;

FIG. 10 is a non-transparent perspective representation of the arrangement shown in FIG. 9;

FIG. 11 shows an overflow pipe of the arrangement shown in FIG. 9;

FIG. 12 shows different views of a further embodiment of the invention;

FIG. 13 shows different views of a further embodiment of the invention;

FIG. 14 shows different variants of an exhaust tract into which a mixer device in accordance with the invention is integrated;

FIG. 15 is a side view of a mixer device in accordance with a further embodiment of the invention;

FIG. 27 shows exemplary cross-sectional shapes of an overflow pipe of a mixer device in accordance with the invention;

Figure 5:
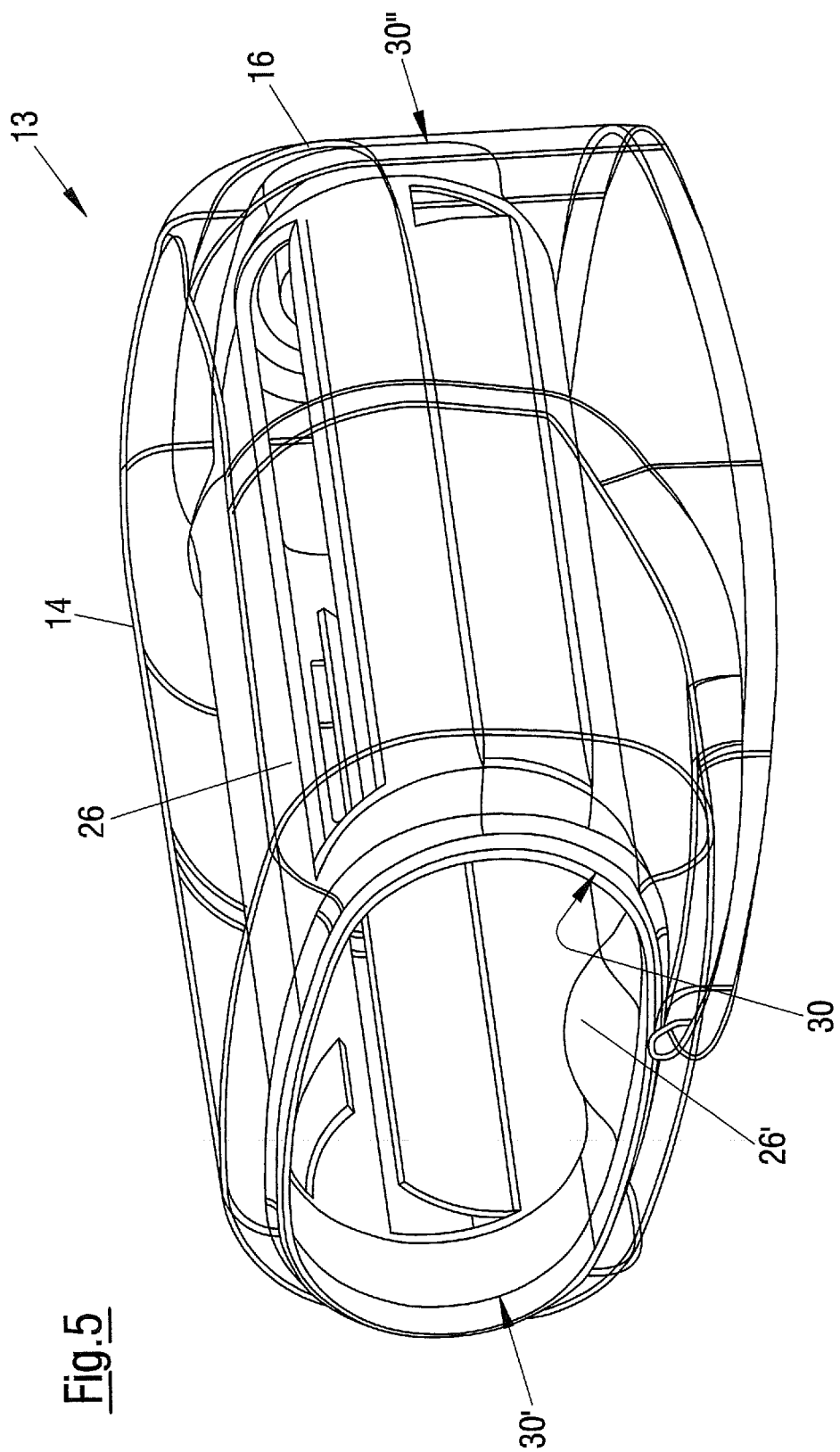
FIG. 5 is a partly transparent perspective representation of a further embodiment of the invention.

In accordance with the invention, a mixer device 13, 13' is provided that is integrated into an exhaust tract 10 that has at least one exhaust gas treatment device 12, 12' (see e.g. FIGS. 1 and 2 or 3 and 4). The mixer devices 13, 13' each comprise a chamber 14 in which an overflow pipe 16 is arranged. A reductant is sprayed (spray cone 19, see e.g. FIG. 3) into the overflow pipe 16 in the axial direction—in particular axially centrally—with the aid of an injector 18. Its surface is comparatively hot since it is flowed around by exhaust gas from the outside. Reductant that comes into contact with it is therefore vaporized at its surface.

The exhaust gas (exhaust gas flow A) flowing into the chamber 14 and around the pipe 16 cannot flow directly onto the spray cone 19 in the embodiment shown. The overflow pipe 16 has openings 20 through which the exhaust gas can flow laterally into the pipe 16. I.e. the openings 20 enable an entry of the gas in the radial direction.

Guide vanes 22 are preferably—but not absolutely necessarily—provided that impart a tangential flow component onto the exhaust gas flowing into the pipe 16 (see flows B), for example by a curved shape of the vanes 22. I.e. it is prevented through this measure that a purely radial exhaust gas flow flows into the pipe 16 through the opening 20 provided with a guide vane 22. The vanes 22 are, for example, formed in one piece with the pipe 16.

With the mixer device 13' in accordance with FIGS. 3 and 4, a plurality of parallel and substantially planar plates 24 are arranged in the upper opening 22 that project into the interior of the pipe 16. The flow-guiding plates 24 form—figuratively speaking—a kind of "venetian blind". In part, the plates 24—in particular the plates 24 facing the injector 18—are partly directly impacted by the cone 19 so that a vaporization of reductant droplets can also take place at the respective plate surface here. This effect can be influenced or avoided as required by a suitable positioning and shape of the plates 24.

Flow guide elements arranged independently of the openings 20 can also be provided. In the mixer device 13, they are sections 26, 26' curved in arc shape or wave shape at the upper side or lower side of the pipe 16 (the sections 26, 26' can also be separate inserts). The sections 26, 26'—figuratively speaking—provide the otherwise approximately oval-shaped pipe 16 at least sectionally a shape of an "8 lying on its side" in a cross-section perpendicular to the longitudinal axis of the pipe 16. They support the formation of oppositely directed swirl flows C of the exhaust gas in the interior of the pipe 16 that result in a particularly homogeneous distribution of the reductant sprayed in.

In the described mixer devices 13, 13', the respective chamber 14 has an inlet opening 28 that enables a lateral onflow of the overflow pipe 16. In this respect, the geometry of the opening 28 corresponds to that of the exhaust gas treatment device 12' (e.g. an oxidation catalyst) to be able to position it close to the chamber 14. An outlet opening 30 of the chamber 14 is arranged coaxially to the pipe 16. It is connected to the device 12 (e.g. a reductant catalyst) via an intermediate pipe 11.

FIG. 5 shows the mixer device 13 with a chamber 14 shown partly transparent. The pipe 16 is formed in one piece. A downstream end 30' of the pipe 16 fits exactly into the opening 30 of the chamber 14 so that substantially the entire exhaust gas has to flow through the pipe 16 before it can leave the chamber 14. A bypass can, however, be provided as required.

A downstream end 30" is connected to the wall of the chamber 14 in a substantially gas-tight manner so that the cone 19 cannot be flowed onto directly by the exhaust gas. A bypass can, however, be provided as required (see e.g. FIG. 9).

Figure 6:
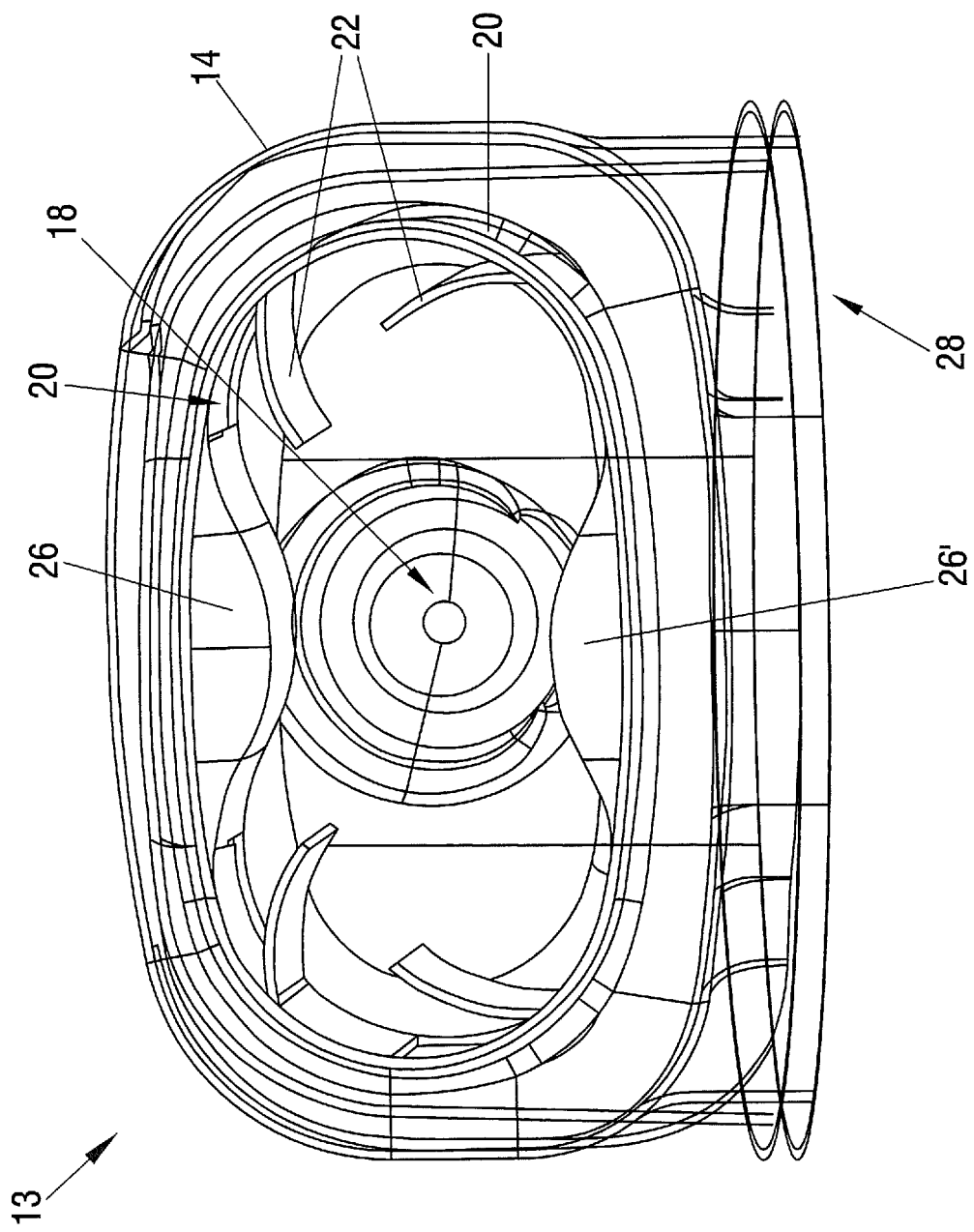
FIG. 6 shows the arrangement in accordance with FIG. 5 from the gas outlet side.

FIG. 6 enables an axial view through the opening 30 into the pipe 16, whereby it can be recognized that the vanes 22 are curved elements cut out of the wall of the pipe 16 and folded inwardly.

Figure 7:
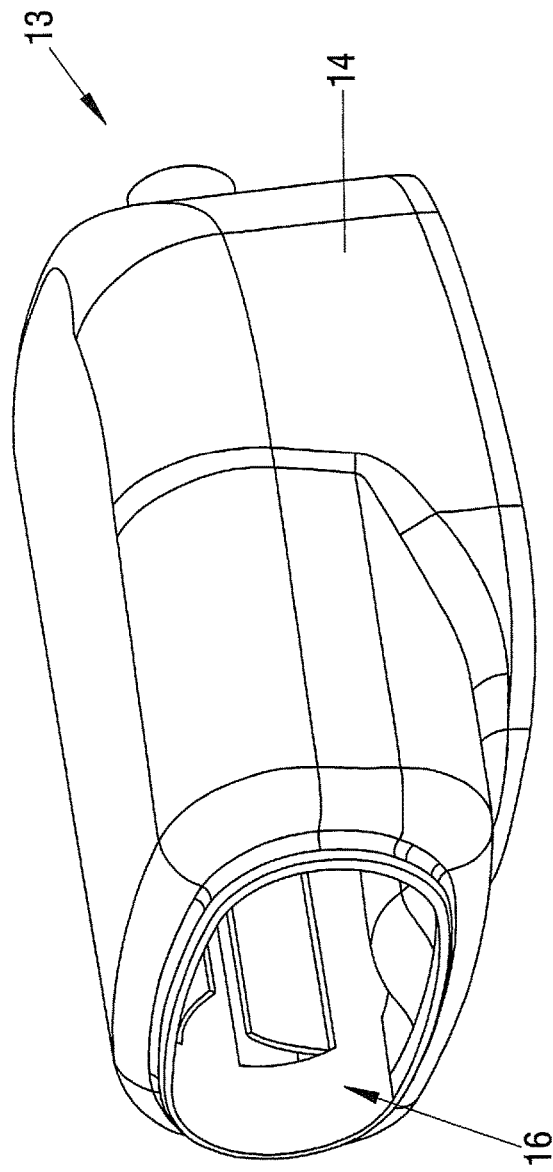
FIG. 7 is a non-transparent perspective representation of the arrangement shown in FIG. 5.

FIG. 7 shows the device 13 with a non-transparent chamber 14.

Figure 8:
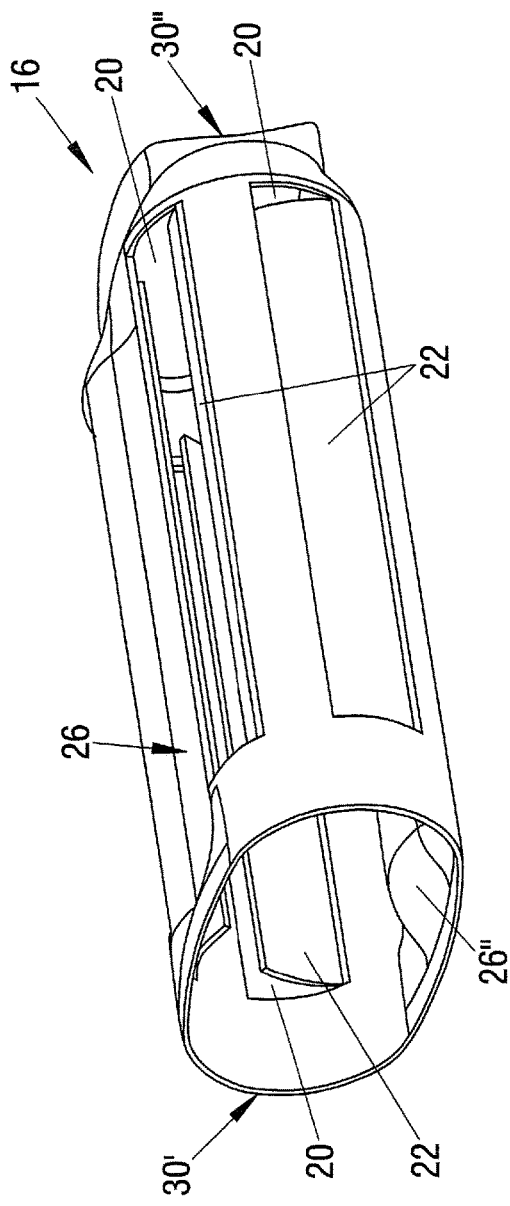
FIG. 8 shows the overflow pipe of the arrangement shown in FIG. 5.

FIG. 8 shows the pipe 16 alone.

Figure 9:
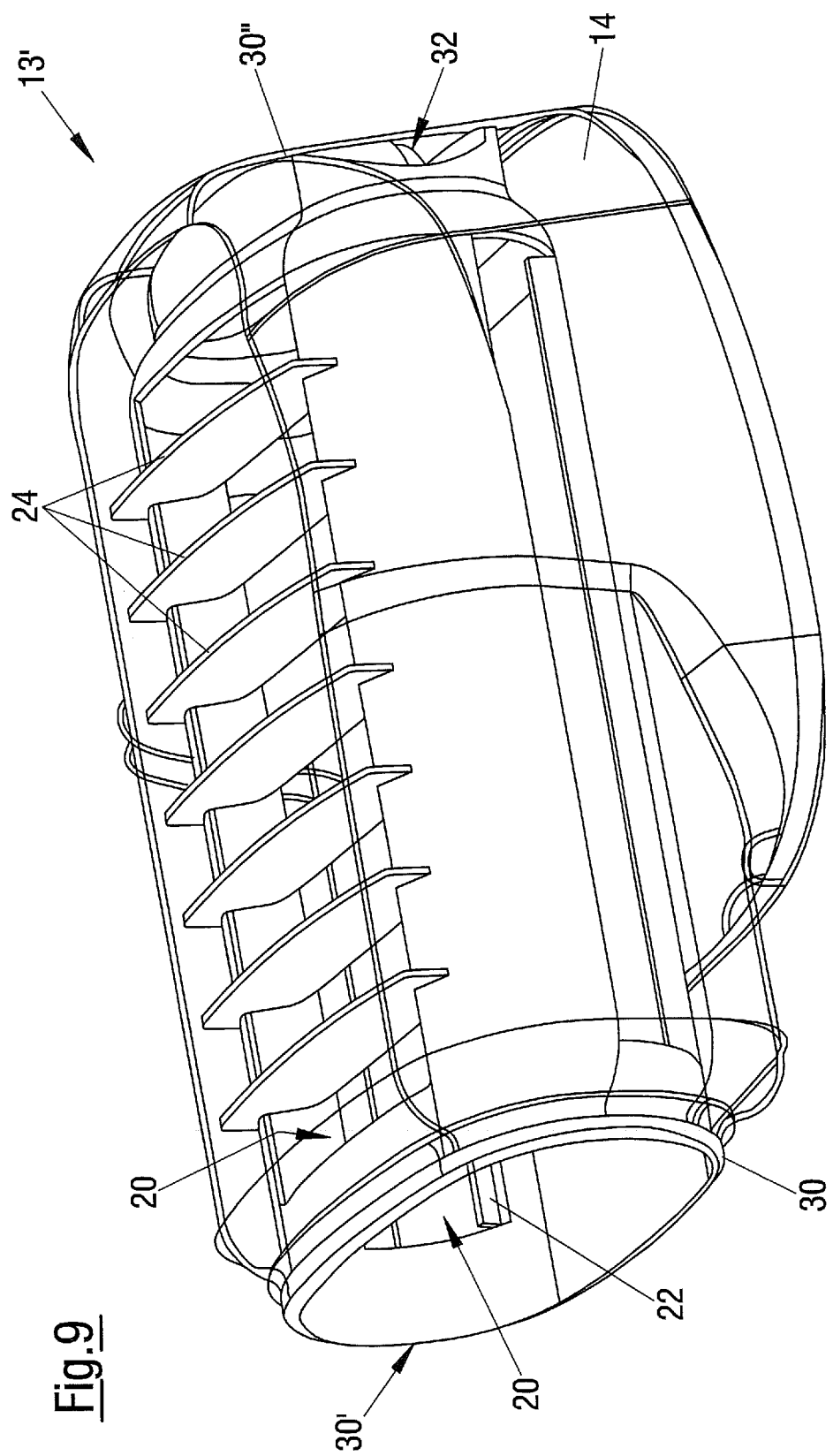
FIG. 9 is a partly transparent perspective representation of a further embodiment of the invention.
Figure 16:
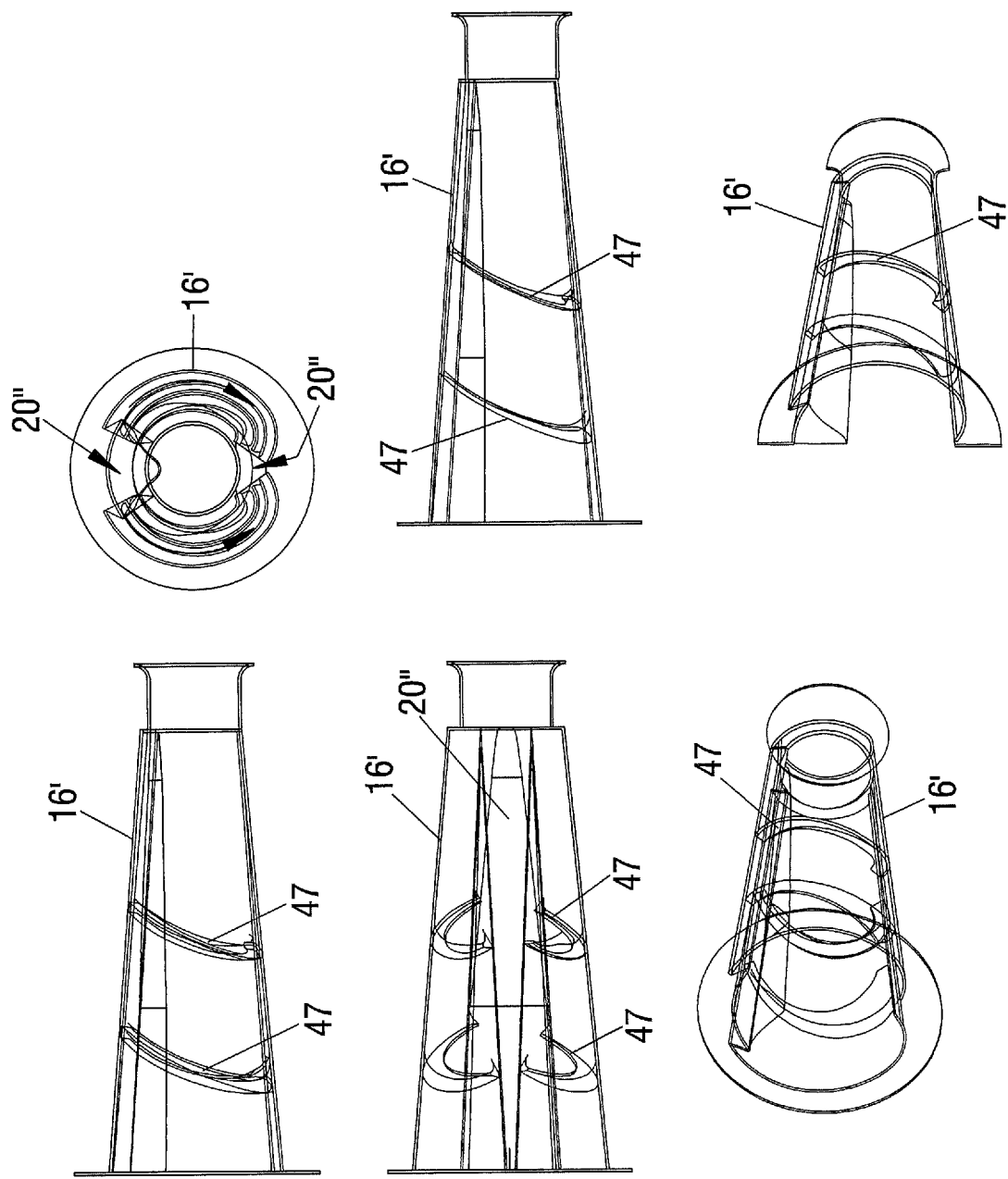
FIG. 16 shows different views of an overflow pipe of the mixer device shown in FIG. 15.

FIG. 9 shows the mixer device 13' with a chamber 14 shown partly transparent. The pipe 16 is not formed in one piece since the separately formed plates 24 are inserted into the upper opening 20. The plates 24 can also not be arranged equidistant from one another and/or obliquely.

The downstream end 30' of the pipe 16 fits—as in the device 13—exactly into the opening 30 of the chamber 14 so that substantially the entire exhaust gas has to flow through the pipe 16 before it can leave the chamber 14. A bypass can, however, be provided as required.

The upstream end 30" is not connected to the wall of the chamber 14 in a gas-tight manner since clearances 32 are provided.

FIG. 10 shows the device 13 with a non-transparent chamber 14.

FIG. 11 shows the pipe 16 alone. It can therefore easily be recognized that the vanes 22 are here only stump-like noses that each have a short planar section 34 that projects into the pipe interior obliquely to a radial direction. It is understood that different vane geometries can be used to obtain the desired flow in the pipe 16. This also means that additional flow guide means can be provided or can be omitted (e.g. the pipe 16 of the device 13' has no sections 26, 26').

FIGS. 12 and 13 each show a plurality of line drawings of the mixer device 13 and 13' respectively in different views and sections.

It must be pointed out that the individual measures described with reference to the devices 13, 13' can be combined as required. It is thus conceivable, for example, to implement the idea "venetian blind" and swirl-generating components (e.g. curved vanes 22 and section 26') in an overflow pipe.

In accordance with the invention, a concept has been developed (described by way of example with reference to the devices 13, 13') in which a high dwell time of the spray metered in can be achieved by an axially central metering of a reductant into an overflow pipe arranged in a chamber. Openings are provided through which the gas can enter into the pipe in a radial direction—possibly directed by flow guide means—before it is impacted by/mixed with reductant.

A double swirl that can be set as required can be generated by vanes folded out of the pipe by the overflow pipe in accordance with an embodiment (e.g. a device 13). This swirl is formed in the region of the overflow pipe and can be used both to generate turbulence and as a drop separator. The pipe flowed around at both sides and the vanes can be used as a vaporization surface by the arrangement.

FIG. 14 shows different examples of how the reductant catalyst 12 can be arranged relative to the mixer device 13. The oxidation catalyst 12' is arranged at a right angle to the overflow pipe 16 in all the examples.

In the embodiment of a mixer device 13" in accordance with the invention shown in FIG. 15, the overflow pipe 16' has a trumpet-like shape and is arranged obliquely to a longitudinal axis L of the exhaust gas treatment devices 12, 12'. A terminal element 40 extends between a jacket surface 45 of the overflow pipe 16' and an inner wall 46 of the chamber 14. The gas moving from the oxidation catalyst 12' into the mixer device 13" is thereby forced to flow substantially completely through the overflow pipe 16'.

Figure 17:
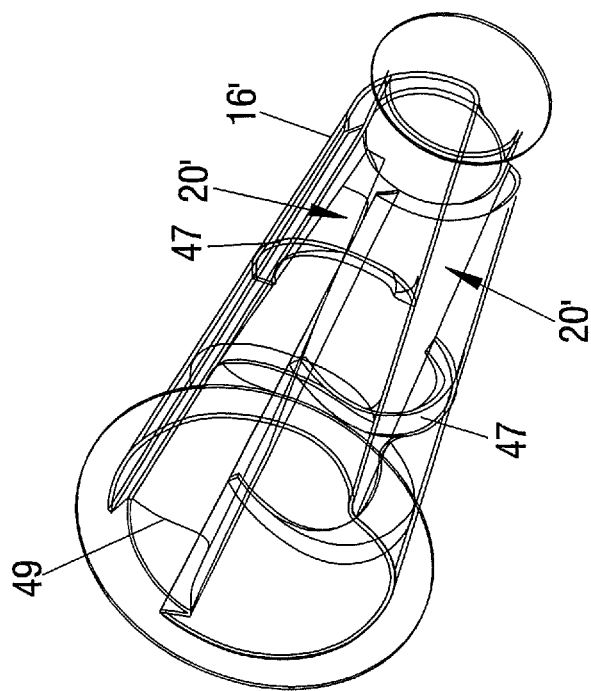
FIG. 17 shows a further view of the overflow pipe shown in FIG. 16.

The trumpet-like overflow pipe 16' is shown individually in FIGS. 16-19. It can be recognized that spiral or helical flow guide elements 47 are arranged at the inner side of the jacket surface 45. They have a swirl-amplifying effect and in particular generate an axial swirl component. The jacket surface 45 has lateral openings 20', 20". One of the openings 20' widens in the axial direction, whereas the other opening 20" narrows in the axial direction (FIG. 17).

Figure 18:
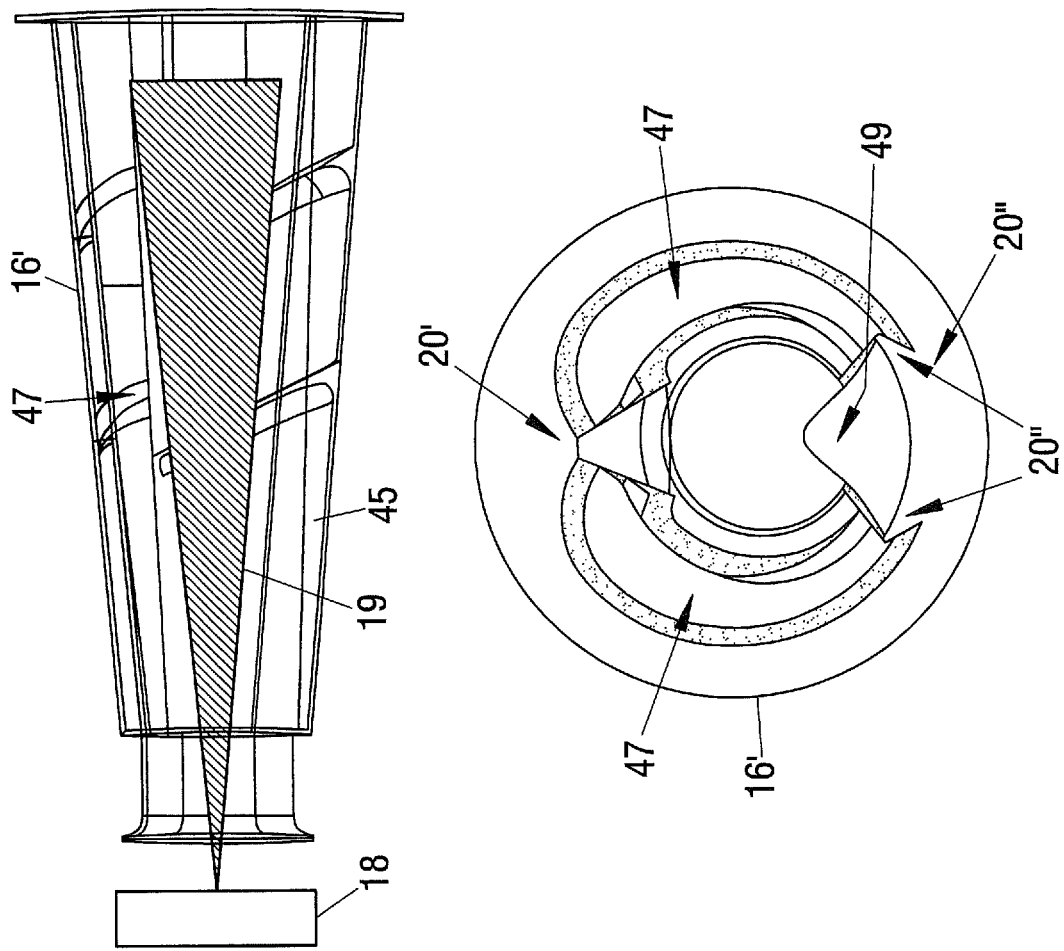
FIG. 18 shows a further view of the overflow pipe shown in FIG. 16.
Figure 19:
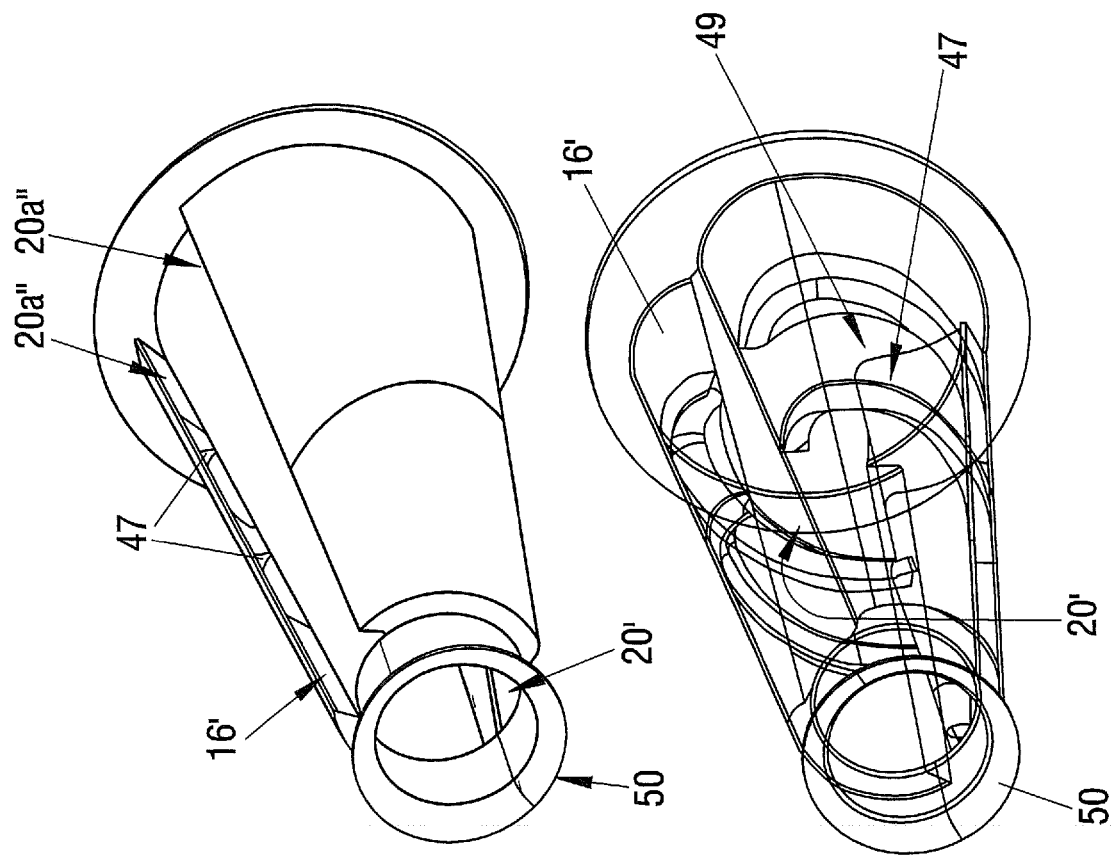
FIG. 19 shows a further view of the overflow pipe shown in FIG. 16.

FIGS. 18 and 19 in particular allow it to be recognized that an onflow section 48 that is set back into the interior of the pipe 16' is provided in the region of the opening 20". Said onflow section is flowed onto directly by the exhaust gas and deflects it into gaps 20a", whereby it moves into the interior of the pipe 16'. The gaps 20a" are thus not flowed onto by exhaust gas frontally or directly. The arrangement and configuration of the gaps 20a" assist the swirl formation of the exhaust gas in the overflow pipe 16'.

The concavity 49 recognizable in the lower part of FIG. 18 and projecting into the overflow pipe 16' likewise has a swirl-amplifying effect. As can in particular be recognized in FIG. 19, an expanded section in the form of a flare 50 is located at the narrowed end of the trumpet-shaped overflow pipe 16'.

Figure 20:
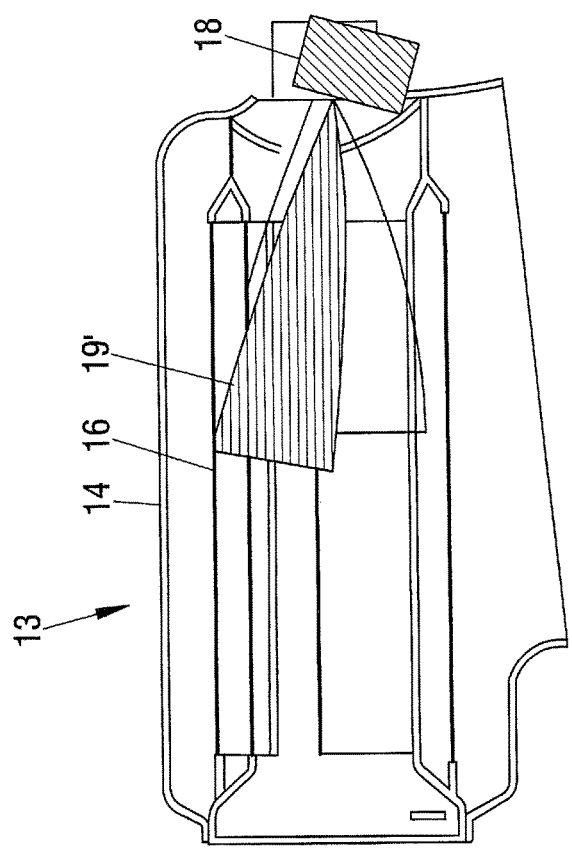
FIG. 20 shows a mixer device in accordance with the invention with an axial injection cone.
Figure 21:
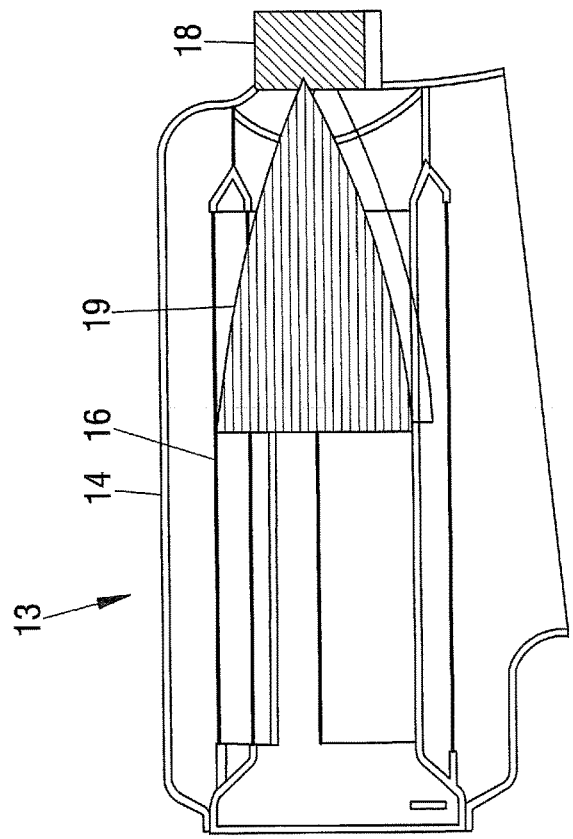
FIG. 21 shows a mixer device in accordance with the invention with an oblique injection cone.

The injector 18 can—as shown in FIG. 20—be arranged such that the spray cone 19' extends in parallel with the longitudinal extent of the overflow pipe 16. Alternatively, the injector 18 can also—as shown in FIG. 21—be arranged such that the spray cone 19 extends obliquely to the longitudinal extent of the overflow pipe 16. The injector 18 can additionally generate a wide spray cone 19 (FIG. 20) or a narrow spray cone 19' (FIG. 21) depending on the configuration and the demand.

Figure 23:
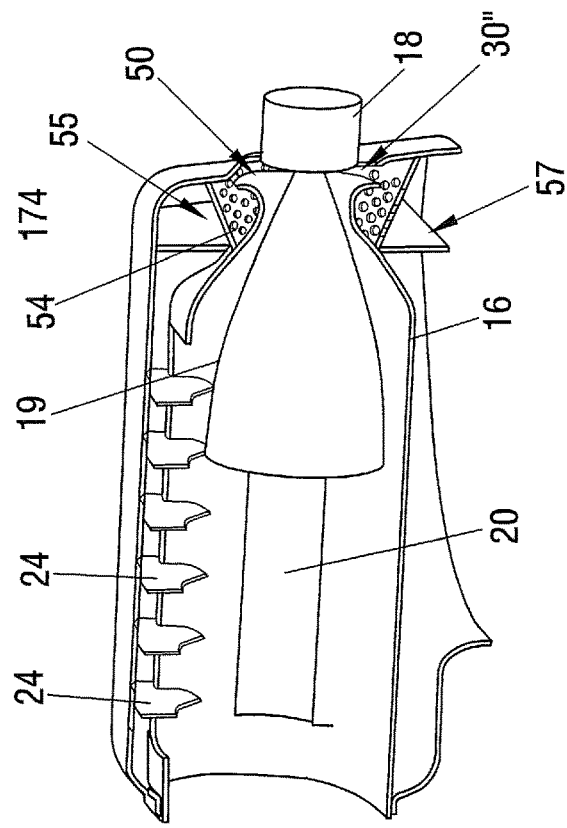
FIG. 23 shows the arrangement in accordance with FIG. 22 obliquely from the rear.
Figure 22:
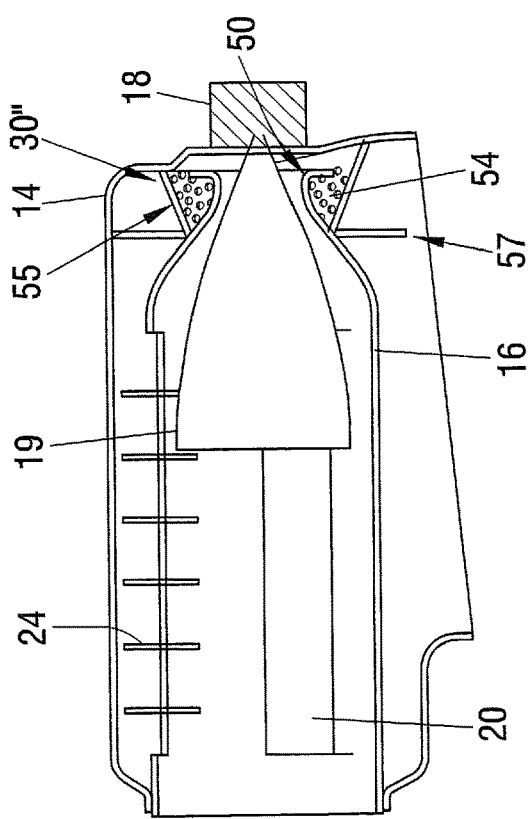
FIG. 22 is a side view of a further embodiment of the invention.

In the embodiment in accordance with FIGS. 22 and 23, a sleeve 55 is provided that is provided with holes 54, that surrounds the region of the upstream pipe end 30" of the overflow pipe 16, and that forms a restrictor element to homogenize the gas pressure. A uniform flushing behind of the nozzle of the injector 18 is thereby effected, whereby the formation of disadvantageous deposits is prevented. A flare 50 is also provided at the upstream pipe end 30" of the overflow pipe 16 in the variant shown in FIGS. 22 and 23. It is surrounded by the sleeve 55 here. A radially extending metal separation sheet 57 that separates an onflow region of the sleeve 55 from an onflow region of the remaining overflow pipe 16 is located beside the sleeve 55.

Figure 24:
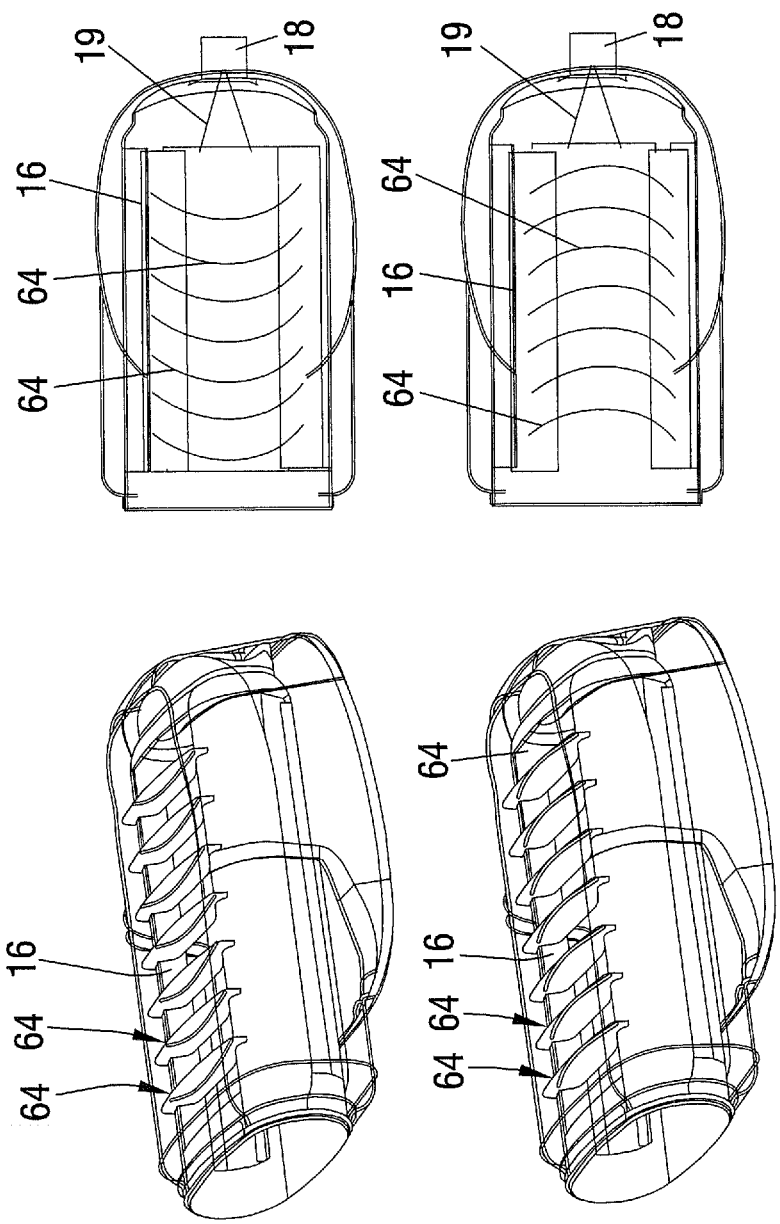
FIG. 24 shows different views of a further embodiment of the invention.
Figure 25:
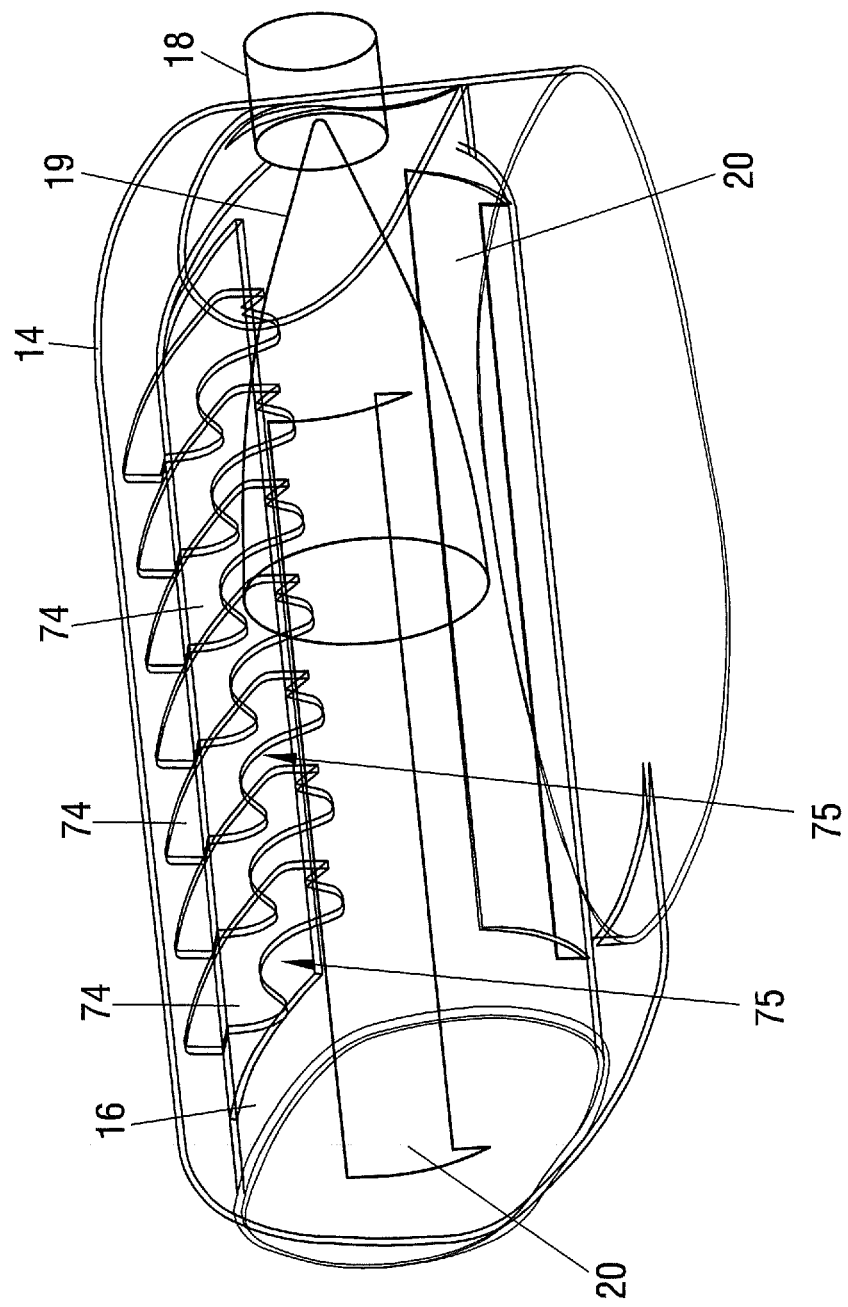
FIG. 25 is a transparent perspective representation of a further embodiment of the invention.

Curved plates 64—as shown in FIG. 24—can also be provided instead of the planar plates 24. They can—as shown in the upper part of FIG. 24—be curved in the injection direction or—as shown in the lower part of FIG. 24 against the injection direction. Both plates curved in the injection direction and plates 64 curved against the injection direction can be provided. The plates 64 can furthermore also have a radial curvature component.

An embodiment having planar plate 74 that are provided with cut-outs 75 at their lower margins to optimize the swirl generation and to avoid a film formation is shown in FIG.

25. The shape and size of the cut-outs 75 can be adapted to the respective application. Provision can also be made that only some of the plates 74 are provided with cut-outs.

Figure 26:
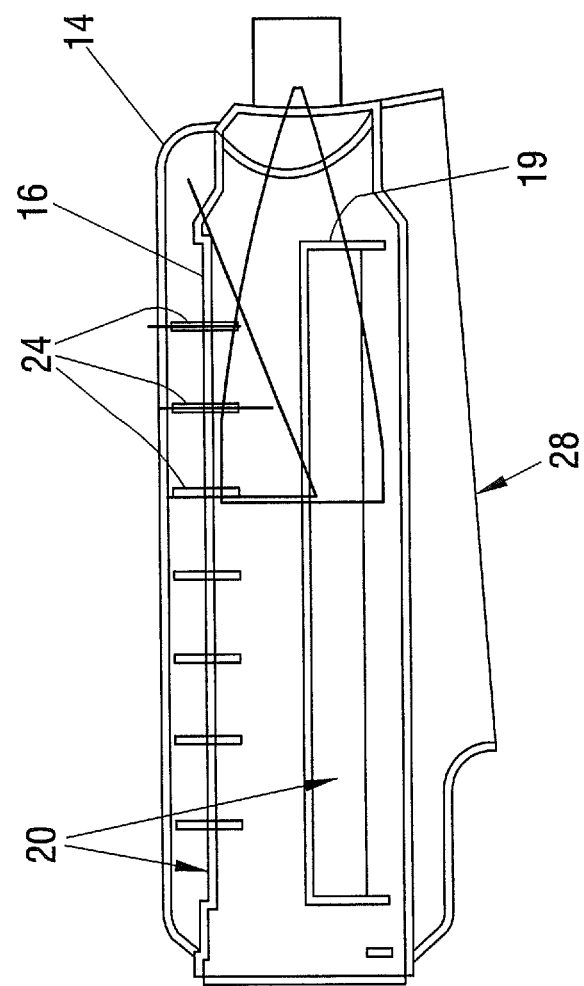
FIG. 26 is a side view of a further embodiment of the invention.

The plates 24 can also be of different sizes and can accordingly project into the overflow pipe 16 up to different distances. Such an embodiment is shown in FIG. 26.

Depending on the construction space restrictions, on the shape of the stray cone 19, 19', and on the flow conditions, the cross-sectional shape of the overflow pipe 16, 16' can be selected differently, for example round, oval, rounded or in the form of an eight lying on its side. Combinations or modifications of the shapes can also be of advantage in specific applications. I.e. the cross-section geometry of the pipe 16 can vary in the axial direction. Two embodiments are shown in FIG. 27.

Figure 28:
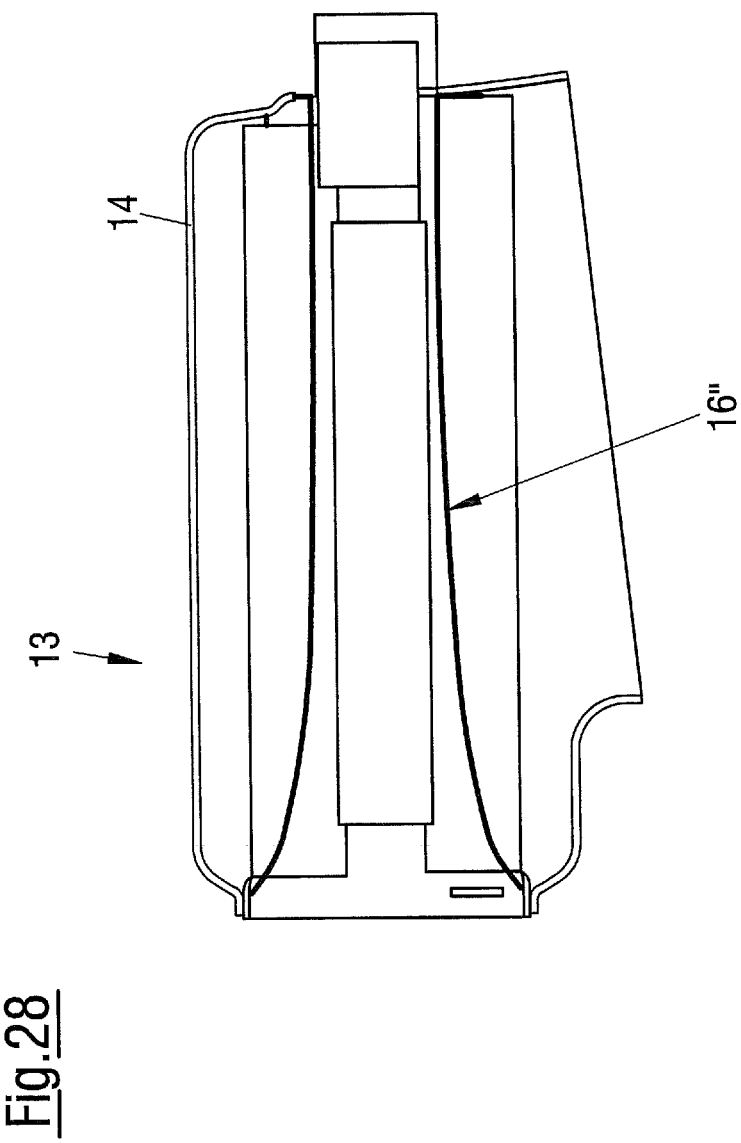
FIG. 28 is a side view of a further embodiment of the invention.
Figure 29:
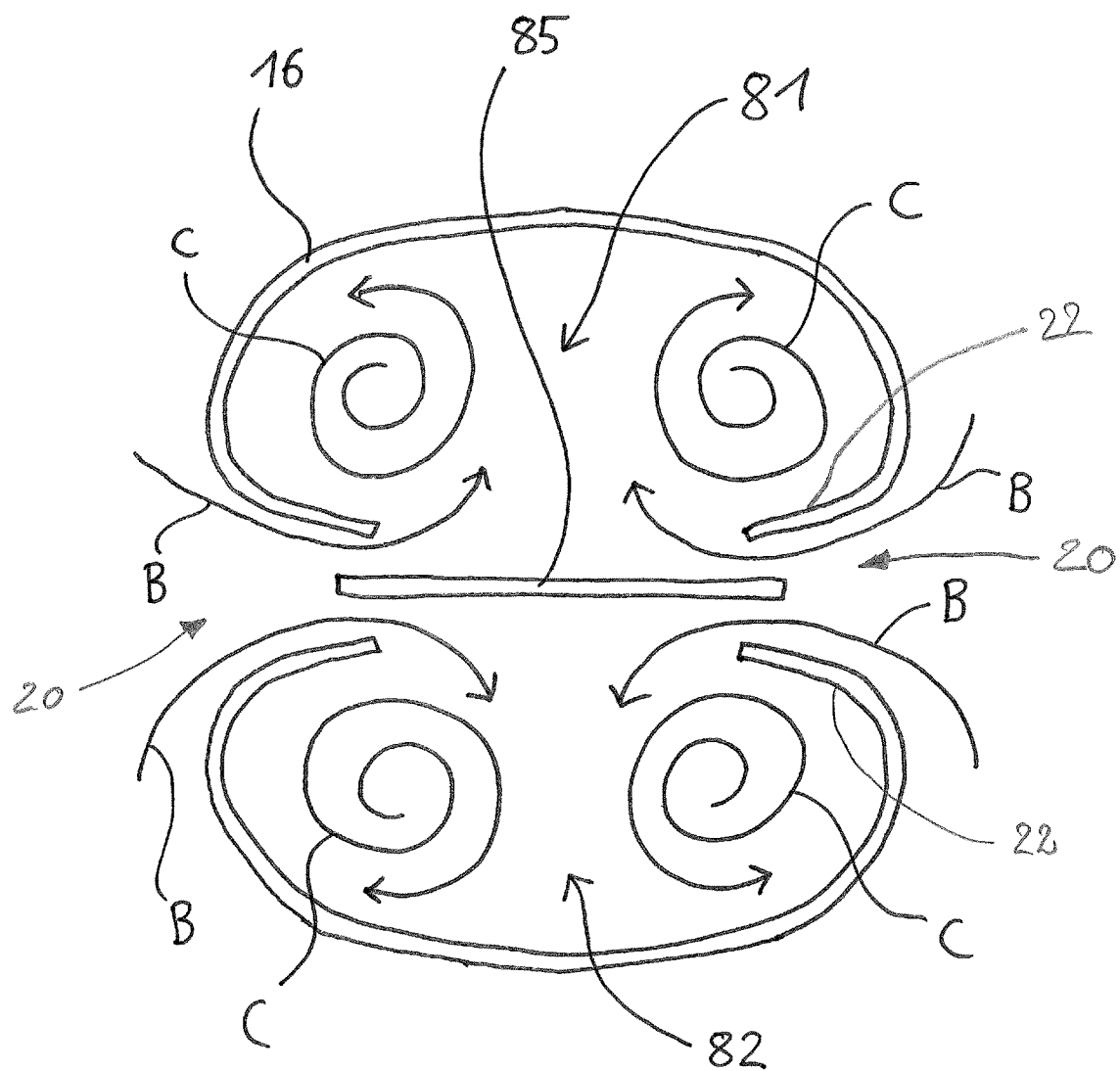
FIG. 29 is a sectional view of a further embodiment of a mixer device in accordance with the invention that comprises an overflow pipe that is configured to generate four different swirl components.

In the embodiment shown in FIG. 28, the overflow pipe 16" is trumpet-shaped viewed in the injection direction A tulip-shaped widening could also be provided.

In the embodiment shown in FIGS. 29-33, a wall element 85 in the form of a planar sheet metal plate is arranged in the overflow pipe 16. The wall element 85 extends in the axial direction and divides the interior of the overflow pipe 16 into two separate flow regions 81, 82. As can be recognized in FIG. 29, the exhaust gas flowing laterally through the openings 20 into the overflow pipe 16 is divided by the wall element 85 into two respective part flows B (into a respective upper and lower part flow B in the drawing) onto which a swirl of opposite senses is imparted. The two part flows B of the respective flow region 81, 82 likewise have swirl components of opposite senses. Four different swirl components are therefore formed in total in the overflow pipe 16. Respective adjacent swirl flows C are of opposite senses. The swirl formation is supported by the curved guide vanes 22.

Figure 30:
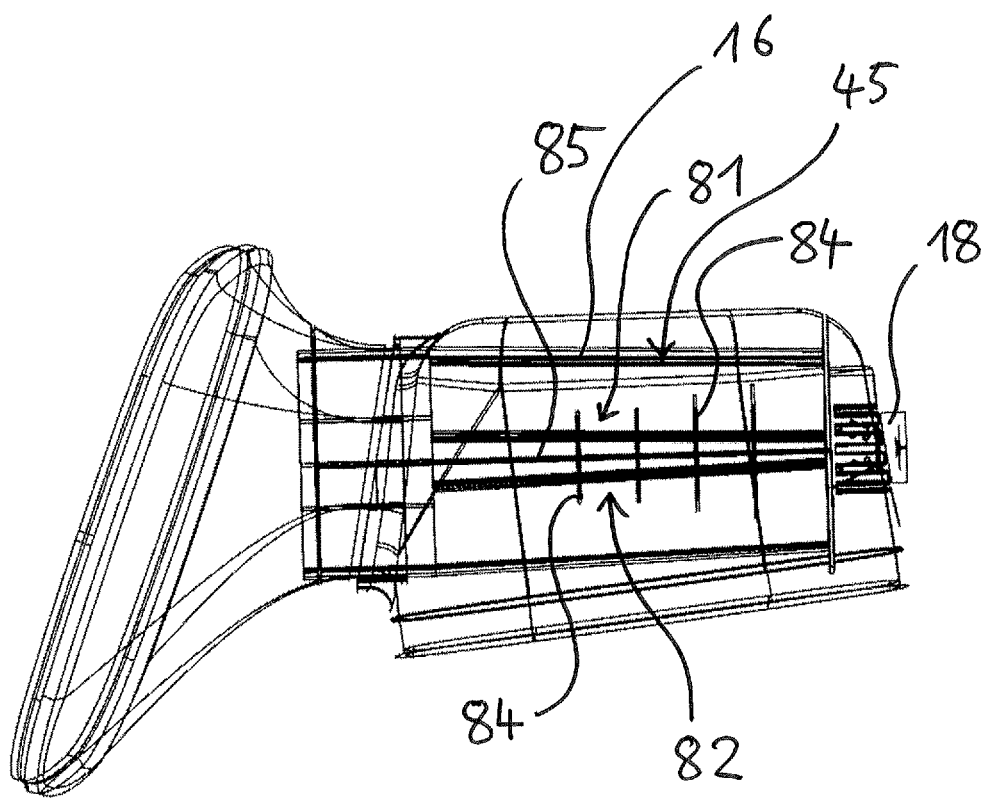
FIG. 30 is a partly transparent side view of the mixer device shown in FIG. 29.
Figure 31:
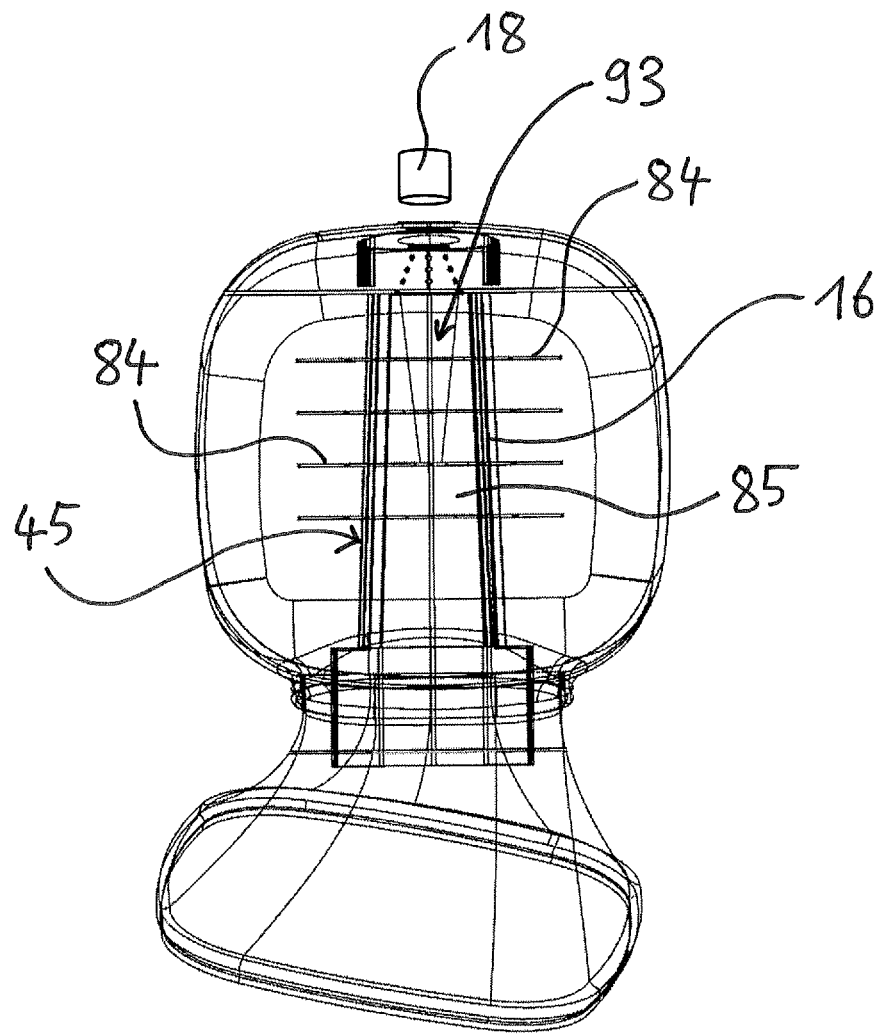
FIG. 31 is a partly transparent plan view of the mixer device shown in FIG. 29.

It can be recognized in FIG. 30 that the wall element 85 passes through an arrangement of planar plates 84. The plates 84 extend through the overflow pipe 16 and project—as can be recognized in FIG. 31—from it at both sides. Some of the plates 84 are provided with central cut-outs 90, as can be seen from FIGS. 32 and 33. The surface of the cut-outs 90 that are substantially circular or hole-like in the present example (other shapes are conceivable, e.g. oval shapes) decreases as the spacing from the injector 18 increases. The plate 84 arranged furthest away from the injector 18 has no cut-out 90.

The wall element 85 is furthermore provided with an open slit 93 that is conical here and that follows the margins of the cut-outs 90.

Figure 34:
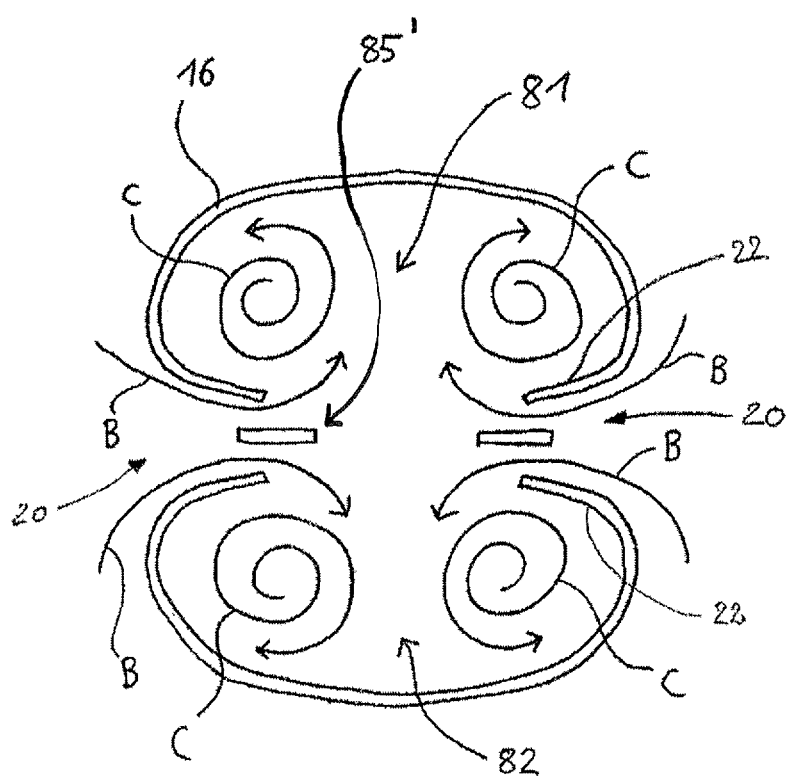
FIG. 34 is a sectional view of a further embodiment of a mixer device in accordance with the invention that is designed in a similar manner to the mixer device in accordance with FIG. 29, but has a modified wall element to separate flow regions.

The separation of the two flow regions 81, 82 does not necessarily have to have a large area. It can be sufficient to separate the flow regions 81, 82 only within a small region or within a plurality of small regions by a wall element 85', as is shown in FIG. 34. The wall element 85' can have a cut-out or can be formed by separate elements.

Figure 35:
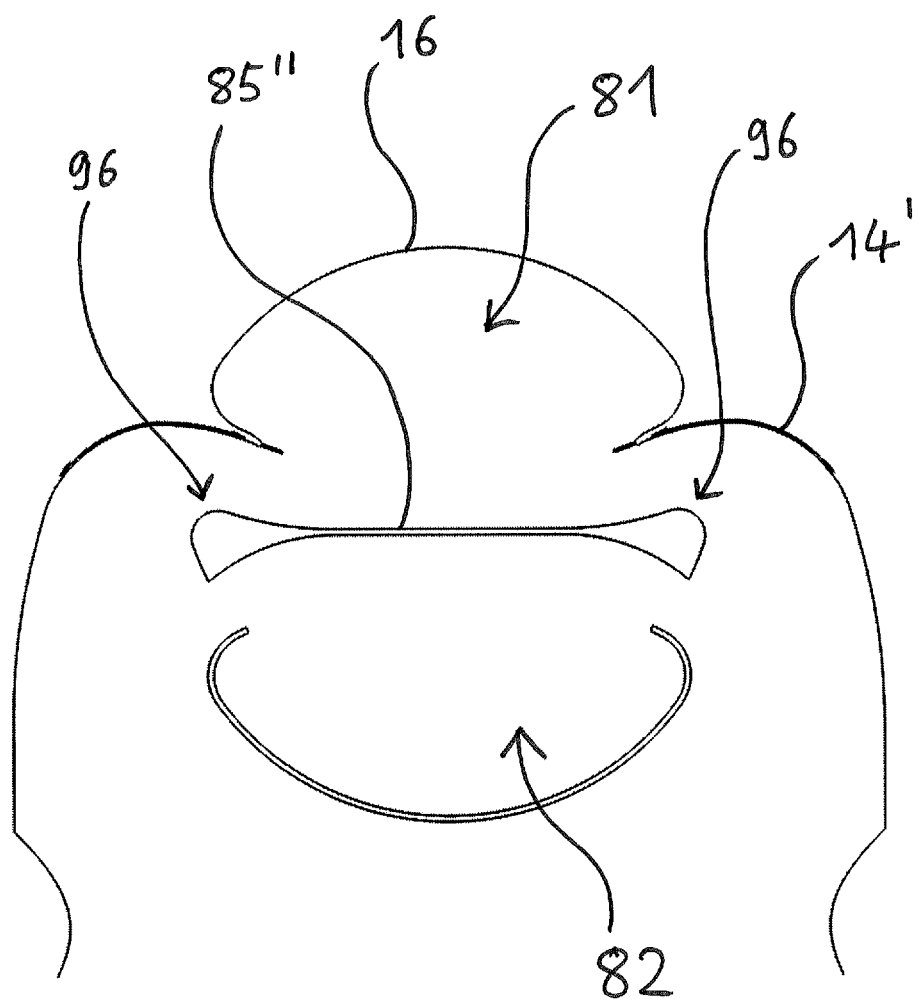
FIG. 35 is a sectional view of a further embodiment of a mixer device in accordance with the invention that has a wall element having bulges.

As shown in FIG. 35, a wall element 85" for separating the flow regions 81, 82 can furthermore be provided that has bulges 96 for a flow optimization. Curved sections are likewise conceivable. The bulges 96 support the inflow of the gas into the pipe 16 and the swirl formation.

A further special feature, that can be realized independently of the wall element 85", of the embodiment shown in FIG. 35 is that the mixing chamber 14' does not completely surround the overflow pipe 16. The upper section of the overflow pipe 16 in the drawing is rather led out of the mixing chamber 14'. The upper section of the overflow pipe 16 can thus form a section of an outer wall of the mixer device.

Figure 32:
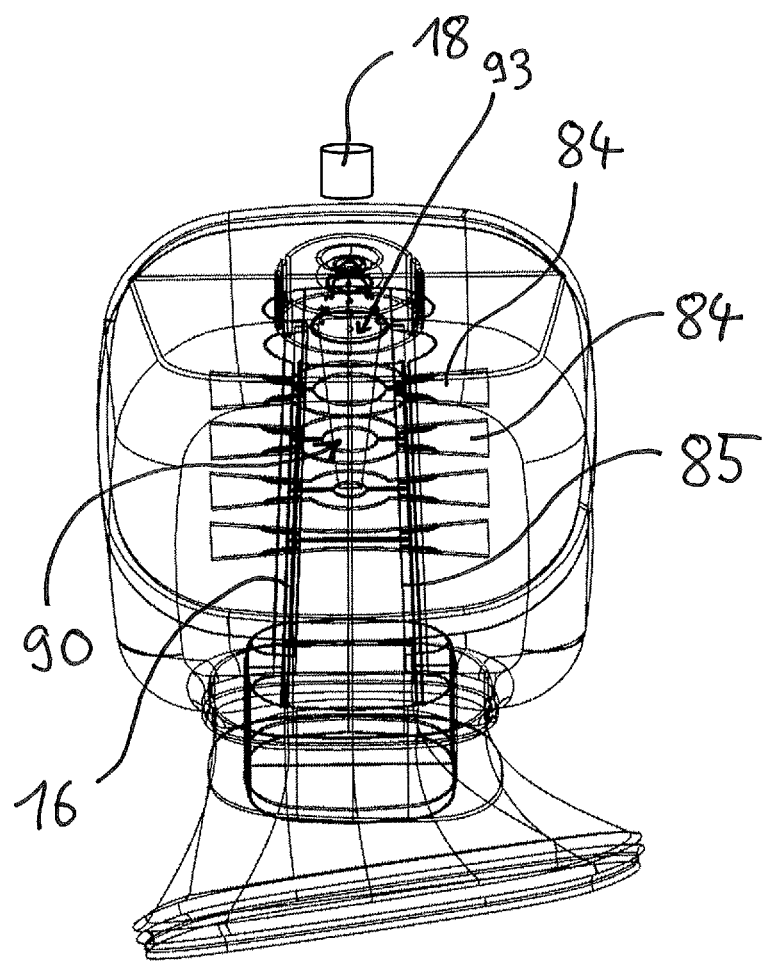
FIG. 32 shows the arrangement in accordance with FIG. 31 obliquely from below.
Figure 33:
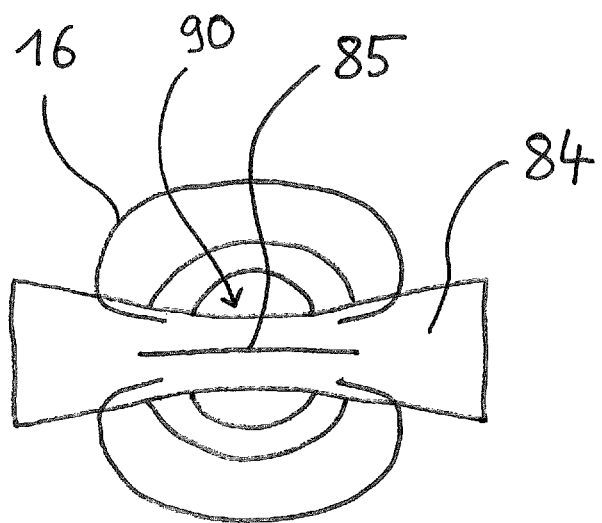
FIG. 33 is a further sectional view of the mixer device shown in FIG. 29.
Figure 36:
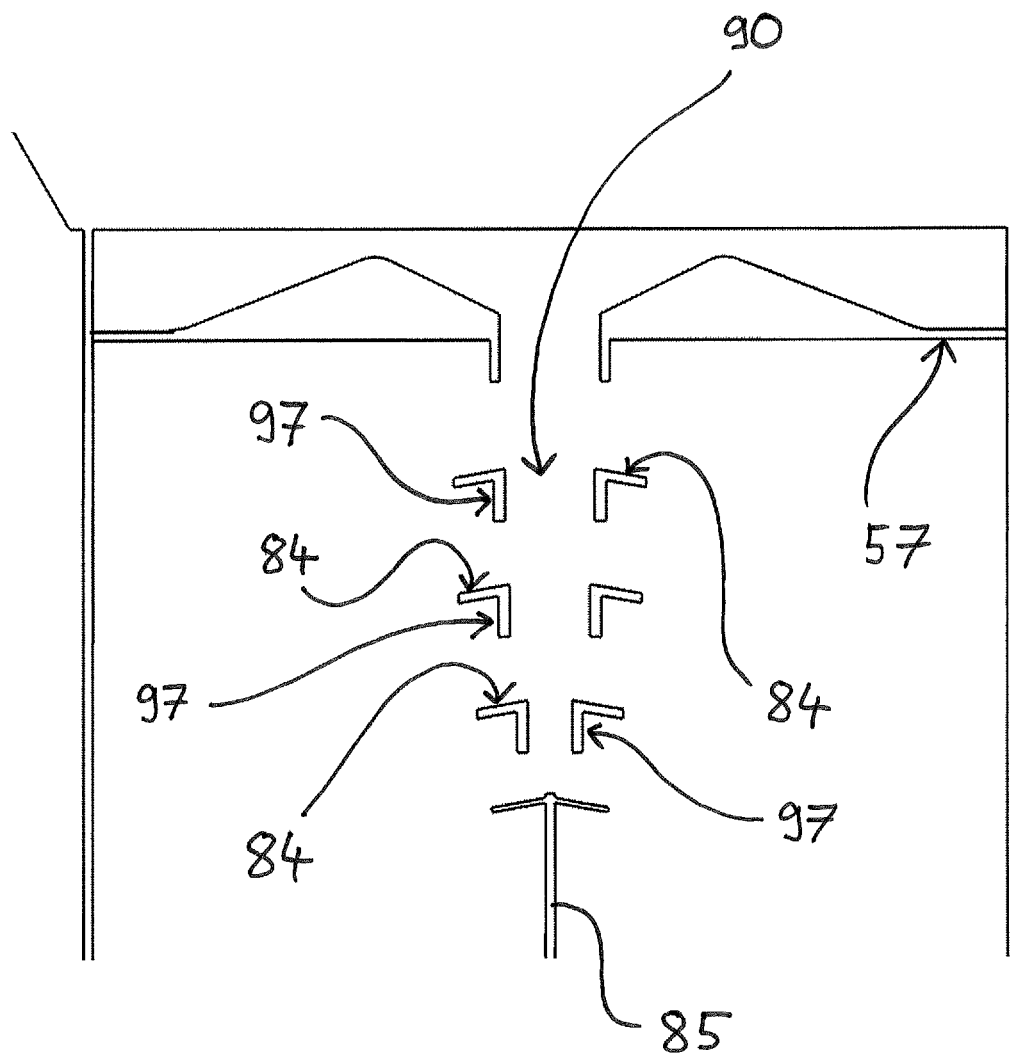
FIG. 36 is a sectional view of a further embodiment of a mixer device in accordance with the invention that has guide plates having sleeve-like sections (passages)

In the embodiment shown in FIG. 36, as in the embodiment shown in FIG. 32, plates 84 having cut-outs 90 are provided. As shown, the borders of the cut-outs 90 here, however, have respective axial passages 97 (sleeve-like sections) that "protect" the injection cone. The diameters of the cut-outs 90 decrease as the spacing from the injector increases. The injection cone is thus successively "peeled off", i.e. a respective outer part of the cone impacts the plates 84 positioned at an angle and is vaporized there or bounces off there and undergoes a secondary atomization.

Figure 37:
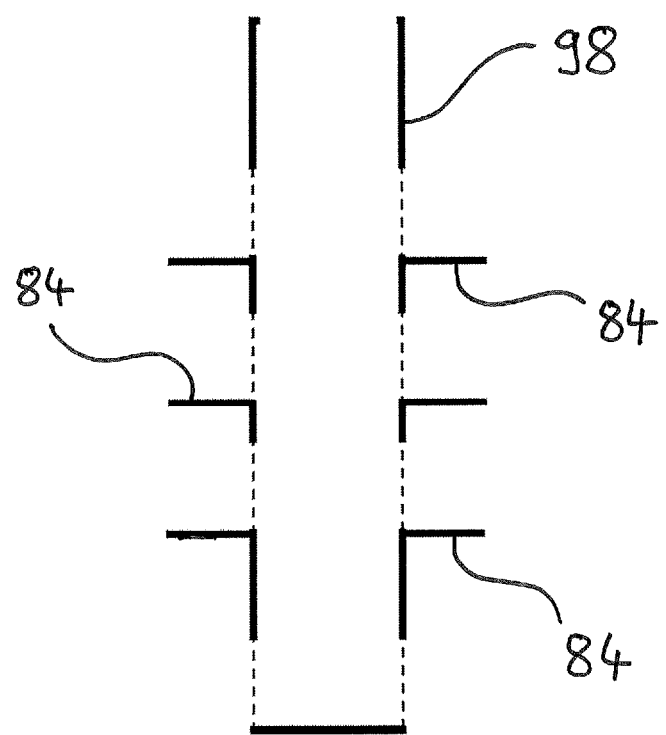
FIG. 37 is a longitudinal section of a pipe element that is provided for arrangement in a mixer device in accordance with the invention.

The plates 84 can also be folded-out wall sections of a pipe element 98. Such an embodiment is shown in FIG. 37.

Figure 38:
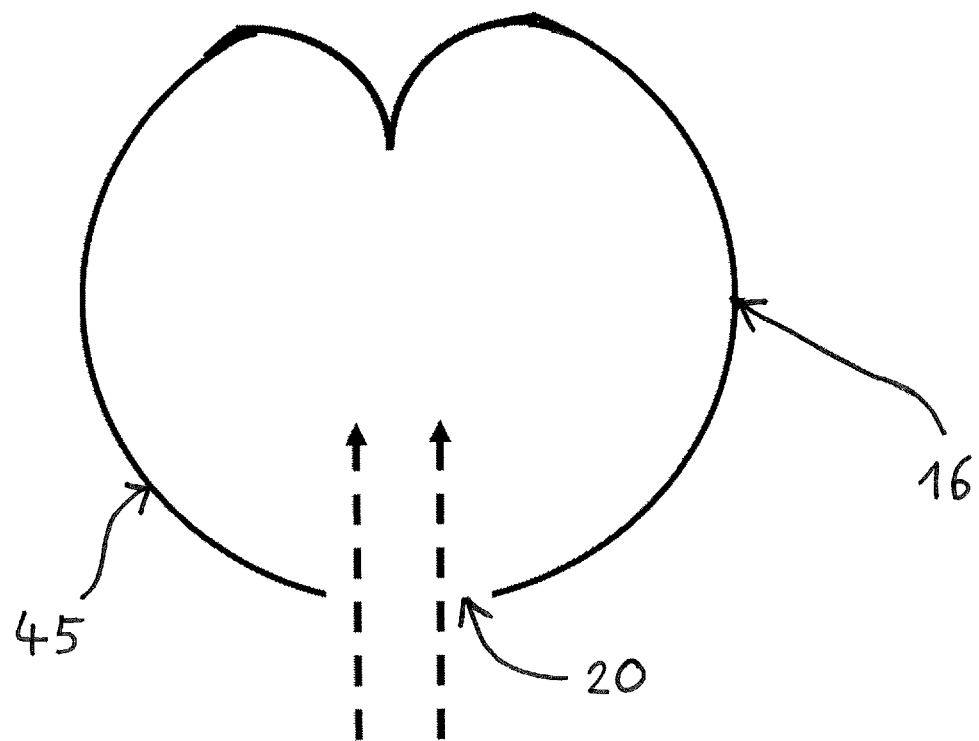
FIG. 38 is a sectional view of a further embodiment of a mixer device in accordance with the invention.

It is generally sufficient to provide the overflow pipe 16, as shown in FIG. 38, with only one single opening 20 through which the gas can flow in. The jacket surface 45 of the pipe 16 is shaped in this respect such that a double swirl effect automatically takes place.

Figure 39:
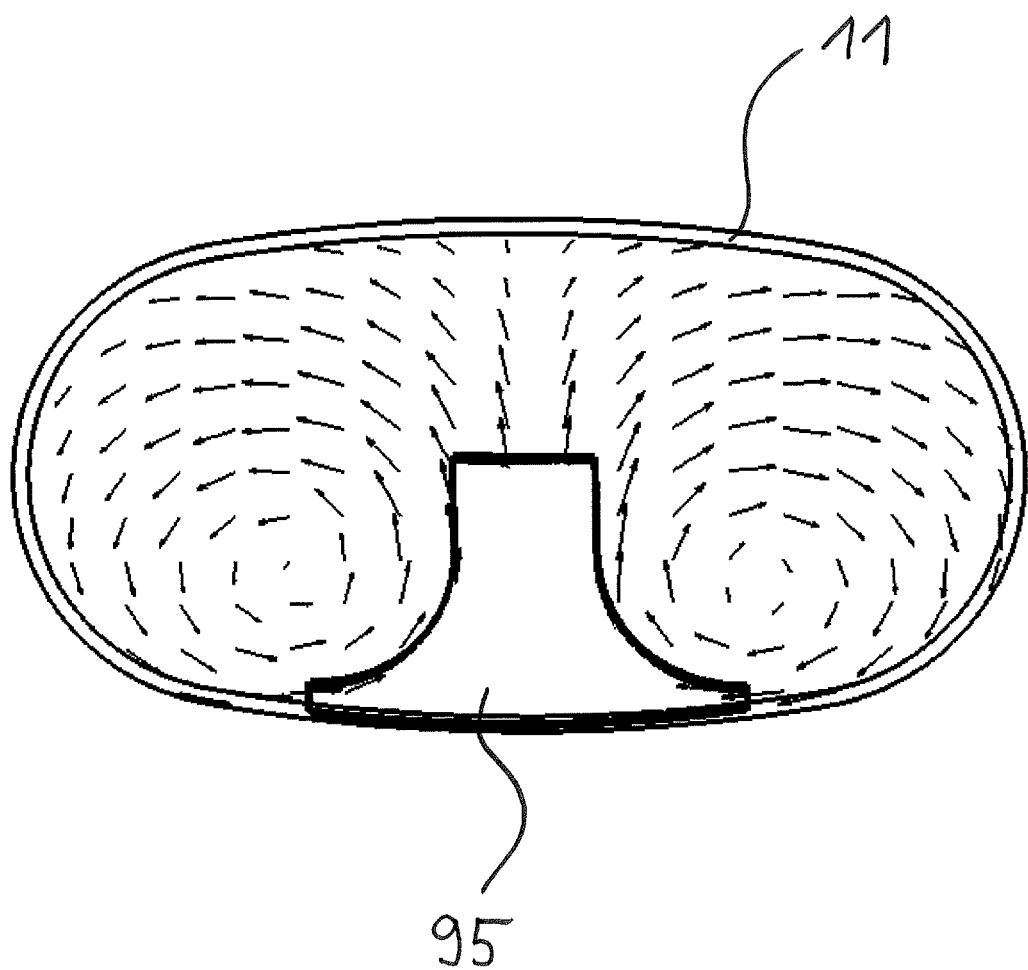
FIG. 39 shows a cross-section through an intermediate pipe of a mixer device in accordance with the invention.

FIG. 39 shows an embodiment of the invention in which a discontinuity element 95 is arranged in the intermediate pipe 11. It impedes the flow section-wise. The discontinuity element 95 is designed here as a planar metal sheet that extends transversely to the flow direction, but with this not being compulsory. It is of T shape by way of example. As can be recognized with reference to the flow pattern indicated by arrows, the crosspiece of the discontinuity element 95 is located in a zone of the intermediate pipe 11 in which a rather calmer flow behavior of the gas is present. The element 95 forces the flowing gas here into more turbulent regions, whereby the homogenization of the gas flow is improved.

The concept in accordance with the invention inter alia has the following advantages:

A very uniform inflow of the exhaust gas—e.g. coming from the diesel oxidation catalyst (DOC)—into the overflow pipe can be achieved by the arrangement with a low counter-pressure. A very high uniform gas distribution into the intermediate pipe to a downstream filter can already hereby be achieved. It proves to be advantageous if the overflow pipe has a comparatively large volume, which is in particular achieved by an ovalization of its cross-section.

The cone of the injected spray can be widened by the generated swirl (e.g. at the device 13) and the region acted on by the reductant can thus be increased. An additional vaporization structure can be simplified or omitted due to the high degree of vaporization in the overflow pipe, which results in a further counter-pressure reduction.

Both the forming swirl and the vaporization can be further increased by a special embodiment having additional elements ("venetian blinds", see e.g. device 13').

REFERENCE NUMERAL LIST 10 exhaust tract
11 intermediate pipe
12, 12' exhaust gas treatment device
13, 13', 13" mixer device
14, 14' chamber
16, 16', 16" overflow pipe
18 injector
19, 19' spray cone
20, 20', 20" opening
20a" gap
22 guide vane
24 planar plate
26, 26' section 28 opening
30 outlet opening
30' downstream end
30" upstream end
32 clearance
34 planar section
40 terminal element
45 jacket surface
46 inner wall
47 flow guide element
48 onflow section
49 concavity
50 flare
54 hole
55 sleeve
57 metal separation sheet
64 curved plate
74 planar plate
75 cut-out
81, 82 flow region
84 planar plate
85, 85', 85" wall element
90 cut-out
93 open slit
95 discontinuity element
96 bulge
97 passage
98 pipe element
A exhaust gas flow
B flow
C swirl flow
L longitudinal axis

The invention claimed is:

1. A mixer device for introducing and distributing a liquid into a gas flow, the mixer device comprising
    a mixing chamber that can be flowed through by the gas flow;
    an overflow pipe that is at least partly arranged in the mixing chamber and that has a jacket surface and a first and second pipe end; and
    at least one injector associated with the first pipe end of the overflow pipe for injecting the liquid into the overflow pipe,
    wherein the jacket surface of the overflow pipe has at least one inflow opening through which gas can flow from the mixing chamber into the overflow pipe for a subsequent mixing with the injected liquid;
    wherein the overflow pipe is configured such that inflowing gas flowing in its interior can have two swirl components of opposite senses imparted onto it;
    wherein the overflow pipe has two inner wall sections generating different swirls, the two inner wall sections being configured to generate and/or to amplify the swirl components of opposite senses;
    wherein the two inner wall sections generating different swirls are formed by lateral regions of a concavity projecting into the overflow pipe; and
    wherein at least one guide vane is arranged at the at least one inflow opening of the overflow pipe and imparts a tangential flow component onto the gas flowing into the overflow pipe.

2. The mixer device in accordance with claim 1, wherein an injection region defined by the at least one injector is located at least partially within the overflow pipe.

3. The mixer device in accordance with claim 1, wherein a gas inlet of the mixer device is associated with the mixing chamber.

4. The mixer device in accordance with claim 1, wherein the second pipe end of the overflow pipe is a gas outlet of the mixer device.

5. The mixer device in accordance with claim 1, wherein the overflow pipe at least sectionally has a kidney-shaped cross-section and/or a cross-section in the form of an eight lying on its side to generate and/or to amplify the swirl components of opposite senses.

6. The mixer device in accordance with claim 1, wherein the at least one guide vane is formed in one piece with the overflow pipe.

7. The mixer device in accordance with claim 1, wherein at least one of an alignment, a curvature, or a surface of the at least one guide vane varies viewed in an axial direction of the overflow pipe.

8. The mixer device in accordance with claim 1, wherein the jacket surface of the overflow pipe has at least two inflow openings having respective guide vanes, with the guide vanes imparting tangential flow components differing direction-wise onto the gas flowing into the overflow pipe to generate and/or to amplify the swirl components of opposite senses.

9. The mixer device in accordance with claim 1, wherein the overflow pipe has an oval or rounded-edge cross-section at least sectionally.

10. The mixer device in accordance with claim 1, wherein a cross-sectional shape and/or a cross-sectional surface of the overflow pipe and/or of the mixing chamber varies viewed in an axial direction of the overflow pipe.

11. The mixer device in accordance with claim 1, wherein size of the at least one inflow opening varies in an axial direction.

12. The mixer device in accordance with claim 1, wherein at least one flow guidance element is arranged at an inner side of the jacket surface and extends in at least one of an axial direction and a peripheral direction of the overflow pipe.

13. The mixer device in accordance with claim 1, wherein a first pipe end of an outflow pipe is connected to an inner wall of the mixing chamber in a gas-tight manner.

14. The mixer device in accordance with claim 1, wherein the first pipe end of the overflow pipe has a widened portion.

15. The mixer device in accordance with claim 1, wherein the mixing chamber and/or the overflow pipe opens/open into an intermediate pipe in which at least one discontinuity element impeding or blocking the flow sectionally is arranged.

16. The mixer device in accordance with claim 1, wherein the interior of the overflow pipe is divided at least sectionally into at least two separate flow regions, in which two swirl components of opposite senses can be respectively imparted onto the inflowing gas to generate and/or to amplify at least four different swirl components.

17. The mixer device in accordance with claim 16, wherein the flow regions are separated from one another by at least one wall element arranged in the overflow pipe and extending along an axial section thereof.

18. The mixer device in accordance with claim 17, wherein the wall element is formed as a planar plate.

19. The mixer device in accordance with claim 1, wherein the first pipe end of the overflow pipe is at least sectionally spaced apart from an inner wall of the mixing chamber.

20. The mixer device in accordance with claim 19, wherein the first pipe end of the overflow pipe is surrounded at least sectionally by a sleeve that is provided with at least one opening.

21. The mixer device in accordance with claim 20, wherein a metal separation sheet extending in a radial direction is provided in the region of the first pipe end of the overflow pipe to separate an onflow region of the sleeve from an onflow region of a remaining overflow pipe.

22. The mixer device in accordance with claim 1, wherein a gas inlet of the mixer device defines an inflow direction extending at a right angle or obliquely to a center axis of the overflow pipe.

23. The mixer device in accordance with claim 3, wherein the jacket surface of the overflow pipe has a section onto which a gas flow flowing in through the gas inlet can flow directly.

24. The mixer device in accordance with claim 23, wherein the jacket surface of the overflow pipe has at least two inflow openings to generate and/or to amplify the swirl components of opposite senses.

25. The mixer device in accordance with claim 24, wherein the inflow openings are arranged laterally offset with respect to a main flow direction defined by the gas inlet of the mixer device and/or are arranged oppositely disposed with respect to a center plane of the overflow pipe.

26. The mixer device in accordance with claim 1, wherein an arrangement of a plurality of guide elements extending transversely to a center axis of the overflow pipe is arranged in the region of the at least one inflow opening of the overflow pipe.

27. The mixer device in accordance with claim 26, wherein the region is remote from a gas inlet of the mixer device.

28. The mixer device in accordance with claim 26, wherein the guide elements are formed by folded-out wall sections of a pipe element.

29. The mixer device in accordance with claim 26, wherein the guide elements project through the at least one inflow opening into the overflow pipe.

30. The mixer device in accordance with claim 26, wherein at least one of the guide elements has at least one cut-out.

31. The mixer device in accordance with claim 30, wherein a border of at least one of the cut-outs has a sleeve section extending in an axial direction.

32. An exhaust gas system comprising:
a first exhaust gas treatment device, and a second exhaust gas treatment device, arranged downstream of the first exhaust gas treatment device,
wherein a mixer device is arranged between the two exhaust gas treatment devices in a flow direction of the exhaust gas, the mixer device comprising:
a mixing chamber that can be flowed through by the gas flow;
an overflow pipe that is at least partly arranged in the mixing chamber and that has a jacket surface and a first and second pipe end; and
at least one injector associated with the first pipe end of the overflow pipe for injecting a liquid into the overflow pipe,
wherein the jacket surface of the overflow pipe has at least one inflow opening through which gas can flow from the mixing chamber into the overflow pipe for a subsequent mixing with the injected liquid;
wherein the overflow pipe is configured such that inflowing gas flowing in its interior can have two swirl components of opposite senses imparted onto it;
wherein the overflow pipe has two inner wall sections generating different swirls, the two inner wall sections being configured to generate and/or to amplify the swirl components of opposite senses;
wherein the two inner wall sections generating different swirls are formed by lateral regions of a concavity projecting into the overflow pipe; and
wherein at least one guide vane is arranged at the at least one inflow opening of the overflow pipe and imparts a tangential flow component onto the gas flowing into the overflow pipe.

33. The exhaust gas system in accordance with claim 32, wherein the mixer device is arranged and configured such that the overflow pipe is arranged perpendicular to a longitudinal axis of the first exhaust gas treatment device.

34. The exhaust gas system in accordance with claim 32, wherein the mixer device is arranged and configured such that the overflow pipe is arranged obliquely to a longitudinal axis of the first exhaust gas treatment device.

35. The exhaust gas system in accordance with claim 34, wherein a terminal element is provided that comprises a wall that extends between the jacket surface of the overflow pipe and an inner wall of the mixing chamber and that forces the gas moving from the first exhaust gas treatment device into the mixer device at least partially through the overflow pipe.

* * * * *